(12) United States Patent
Lehmann et al.

(10) Patent No.: US 9,848,026 B2
(45) Date of Patent: Dec. 19, 2017

(54) SIMULTANEOUS WIRELESS CONNECTIONS WITH IMPROVED EFFICIENCY

(71) Applicant: Apple Inc., Cupertino, CA (US)

(72) Inventors: Siegfried Lehmann, Sunnyvale, CA (US); Christiaan A. Hartman, San Jose, CA (US); Camille Chen, Cupertino, CA (US); Sriram Hariharan, San Jose, CA (US); Jianxiong Shi, Cupertino, CA (US); Syed Aon Mujtaba, Santa Clara, CA (US); Alessio Centazzo, Sunnyvale, CA (US); Donald Eng, Cupertino, CA (US); Michael J. Giles, San Jose, CA (US); Craig P. Dooley, Los Gatos, CA (US); Akshay Mangalam Srivatsa, Sunnyvale, CA (US); Anjali S. Sandesara, Sunnyvale, CA (US); Langford M. Wasada, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 15/001,116

(22) Filed: Jan. 19, 2016

(65) Prior Publication Data

US 2016/0360526 A1 Dec. 8, 2016

Related U.S. Application Data

(60) Provisional application No. 62/171,478, filed on Jun. 5, 2015.

(51) Int. Cl.
*H04L 29/06* (2006.01)
*H04W 4/00* (2009.01)
(Continued)

(52) U.S. Cl.
CPC ........ *H04L 65/4076* (2013.01); *G06F 1/3209* (2013.01); *G06F 1/3278* (2013.01);
(Continued)

(58) Field of Classification Search
CPC ......... H04L 65/4076; H04L 2012/5675; H04L 1/1893; H04L 12/5692; H04L 47/76;
(Continued)

(56) References Cited

U.S. PATENT DOCUMENTS

2005/0141449 A1* 6/2005 Yuang .................. H04W 74/08 370/329
2006/0211437 A1* 9/2006 Yang ...................... H04W 4/08 455/518

(Continued)

*Primary Examiner* — Warner Wong
(74) *Attorney, Agent, or Firm* — Downey Brand LLP

(57) ABSTRACT

An interface circuit in a computing device may communicate with user-interface devices using shared slots during time intervals. In particular, the computing device may transmit outgoing messages to the user-interface devices at a first predefined time during sequential time intervals when the user-interface devices transition from a sleep mode to a normal mode. In response, the computing device may receive incoming messages from one or more of the user-interface devices at a second predefined time following the first predefined time during the sequential time intervals. Then, the computing device may transmit a multicast message to the user-interface devices at a third predefined time during the sequential time intervals. In response to the given multicast message, one of the user-interface devices may communicate data to the computing device. Note that, in some instances, a multicast time slot may instead be used to communicate data to one of the user-interface devices.

20 Claims, 24 Drawing Sheets

(51) Int. Cl.
*G06F 3/02* (2006.01)
*G06F 1/32* (2006.01)
*H04W 28/06* (2009.01)

(52) U.S. Cl.
CPC .......... *G06F 3/0227* (2013.01); *H04W 4/008* (2013.01); *H04W 28/06* (2013.01)

(58) Field of Classification Search
CPC .... H04L 47/70; H04L 47/78; H04W 72/0446; H04W 65/4076; H04W 4/008; H04W 16/02; H04W 16/04; H04W 16/10; H04W 28/00; H04W 28/06; G06F 9/5083
See application file for complete search history.

(56) References Cited

U.S. PATENT DOCUMENTS

| | | | | |
|---|---|---|---|---|
| 2007/0070418 | A1* | 3/2007 | Enmei | G06F 1/1616 358/1.15 |
| 2013/0013806 | A1* | 1/2013 | Woo | H04W 72/005 709/238 |
| 2013/0155933 | A1* | 6/2013 | Kneckt | H04W 74/002 370/312 |
| 2014/0003314 | A1* | 1/2014 | Shu | H04W 72/0446 370/311 |
| 2014/0321349 | A1* | 10/2014 | Seok | H04W 74/08 370/311 |
| 2016/0029231 | A1* | 1/2016 | Kazmi | H04W 72/1226 370/252 |
| 2017/0257902 | A1* | 9/2017 | Xing | H04W 76/025 |

* cited by examiner

SIMULTANEOUS WIRELESS CONNECTIONS WITH IMPROVED EFFICIENCY

CROSS-REFERENCE TO RELATED APPLICATION

This application claims priority under 35 U.S.C. §119(e) to U.S. Provisional Application Ser. No. 62/171,478, entitled "Extended Sniff Mode for User-Interface Devices," by Alessio Centazzo, Donald Eng, Michael J. Giles, Craig P. Dooley, Akshay Srivatsa, Anjali S. Sandesara, Sriram Hariharan and Langford M. Wasada, filed on Jun. 5, 2015, the contents of which are herein incorporated by reference.

BACKGROUND

Field

The described embodiments relate to techniques for improving communication performance in a wireless network, including techniques for communicating additional messages with a user-interface device during a power-saving mode.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

In order to save power, a networking subsystem in an electronic device may transition to a power-saving mode such as a sleep mode. For example, a networking subsystem communicating messages using Bluetooth may transition to a sniff mode. During the sniff mode, the networking subsystem may periodically transition to a normal mode to receive an incoming message from another electronic device and to transmit an outgoing message in response using reserved slots. Then, the networking subsystem may revert to a sleep mode until the next predefined time (or anchor point) when another incoming message is to be received.

While the sniff mode maintains communication between the electronic devices and reduces power consumption, there is a fixed time interval (or "sniff interval") between the anchor points. This fixed sniff interval can cause a noticeable delay or latency for some applications. In addition, the fixed sniff interval can consume communication capacity even when an electronic device is inactive or does not have any data to communicate with another electronic device. If multiple electronic devices communicate concurrently using Bluetooth, the reduced communication capacity can degrade the communication performance. Consequently, the use of the sniff mode may sometimes degrade the user's experience.

SUMMARY

A first group of described embodiments relates to a user-interface device that includes a user-interface component that receives user-interface events, e.g., from a user. The user-interface device also includes: an antenna; an interface circuit that communicates, via the antenna, with a computing device via a link using a communication protocol. During operation, the interface circuit transitions from a sleep mode to a normal mode prior to a first predefined time during a time interval. Then, the interface circuit listens for and/or receives an incoming message from the computing device at the first predefined time, and transmits an outgoing message to the computing device at a second predefined time. When the outgoing message includes information specifying a user-interface event, the interface circuit waits in the normal mode to receive a reply message from the computing device with feedback based on the information. Alternatively, when the outgoing message excludes the information, the interface circuit transitions from the normal mode to the sleep mode for the duration of the time interval.

Moreover, during operation, the interface circuit may receive the reply message with the feedback, and the user-interface component may provide the feedback to the user.

Furthermore, the interface circuit may wait in the normal mode to receive the reply message until at most the second predefined time in a subsequent instance of the time interval.

Additionally, the interface circuit may wait in the normal mode to receive the reply message based on: a type of the user-interface component, and/or a type of the user-interface event.

Note that the user-interface component may include a touchpad.

In some embodiments, the communication protocol includes Bluetooth and the time interval includes a sniff interval.

Moreover, the interface circuit may include: a processor, and a memory that stores an embedded operating system. During operation, the processor may execute the embedded operating system and may perform the operations of: the transitioning, the receiving, the transmitting to the normal mode, the waiting, and the transitioning to the sleep mode.

Other embodiments provide a computer-program product for use with the interface circuit in the user-interface device. This computer-program product includes instructions for at least some of the aforementioned operations performed by the interface circuit.

Other embodiments provide a method for communicating with the computing device via the link using the communication protocol, which may be performed by the interface circuit. During this method, the interface circuit performs at least some of the aforementioned operations.

In addition, the described embodiments relate to the computing device that includes: a second antenna; and a second interface circuit that communicates, via the second antenna, with the user-interface device via the link using the communication protocol. During operation, the second interface circuit transmits the outgoing message to the user-interface device at the first predefined time during the time interval when the user-interface device transitions from the sleep mode to the normal mode. Then, the second interface circuit receives the incoming message from the user-interface device at the second predefined time. When the incoming message includes the information specifying the user-interface event associated with user interaction with the user-interface component in the user-interface device, the second interface circuit: forwards the information for further processing in the computing device; receives the feedback from the computing device based on the information; and transmits the reply message to the user-interface device with the feedback during the time interval.

Moreover, the second interface circuit performs the operations of the forwarding, the receiving of the feedback and the transmitting of the reply message based on: the type of the user-interface component, and/or the type of the user-interface event.

In some embodiments, the second interface circuit includes: a second processor, and a second memory that stores a second embedded operating system. During operation, the second processor may execute the second embedded operating system and may perform the operations of: the transmitting of the outgoing message, the receiving of the incoming message, the forwarding, the receiving of the feedback, and the transmitting of the reply message.

Furthermore, during operation, the second interface circuit may dynamically determine a priority of the reply message relative to other types of communication handled by the second interface circuit. For example, the other types of communication may include communication with a second user-interface device that includes a second user-interface component via a second link using the communication protocol, and the priority may be based on a type of the second user-interface component. Alternatively or additionally, the other types of communication may include communication using another communication protocol, and the priority may be based on a type of the other communication protocol.

Other embodiments provide a second computer-program product for use with the second interface circuit in the computing device. This computer-program product includes instructions for at least some of the aforementioned operations performed by the second interface circuit.

Other embodiments provide a method for communicating with the user-interface device via the link using the communication protocol, which may be performed by the second interface circuit. During this method, the second interface circuit performs at least some of the aforementioned operations.

A second group of described embodiments relates to a computing device that communicates with user-interface devices. This computing device includes: an antenna; and an interface circuit that, during operation, communicates with the user-interface devices via a link using a communication protocol. Moreover, during operation, the interface circuit transmits outgoing messages to the user-interface devices at a first predefined time during sequential time intervals when the user-interface devices transition from a sleep mode to a normal mode, where a given outgoing message at the first predefined time during a given sequential time interval is addressed to a given user-interface device. Then, the interface circuit receives incoming messages from the user-interface devices at a second predefined time following the first predefined time during the sequential time intervals, where a given incoming message is received at the second predefined time during the given sequential time interval from the given user-interface device. Next, the interface circuit transmits multicast messages to the user-interface devices at a third predefined time following the second predefined time during each of the sequential time intervals.

Note that the communication protocol may include Bluetooth and the sequential time intervals may include sniff intervals.

Moreover, during operation the interface circuit may receive, in response to one of the multicast messages, an incoming message from one of the user-interface devices at a fourth predefined time after the third predefined time in one of the sequential time intervals. If the incoming message includes data, the interface circuit may transmit an acknowledgment message to the one of the user-interface devices at one of the first predefined time and the third predefined time in a subsequent time interval after the one of the sequential time intervals. In some embodiments, the incoming message encompasses more than one time slot in the one of the sequential time intervals.

Furthermore, if, during operation, a collision occurs between the incoming message and a second incoming message, the interface circuit may sequentially poll the user-interface devices to receive the incoming message and the second incoming message without a subsequent collision.

Additionally, if, during operation, a number of collisions exceeds a threshold value, the interface circuit may transmit the outgoing messages at predefined times during each of the sequential time intervals and discontinues transmitting the multicast messages.

In some embodiments, during operation, when the interface circuit has data for one of the user-interface devices, the interface circuit transmits the data using a first occurrence of: an outgoing message at the first predefined time during one of the sequential time intervals addressed to the one of the user-interface devices; or one of the multicast messages.

Moreover, during operation, the interface circuit may communicate to the user-interface devices an adaptive frequency-hopping schedule and a future start time when the adaptive frequency-hopping schedule is used, so that the user-interface devices listen to correct frequencies during transmission of the multicast messages.

Furthermore, during operation, the interface circuit may transmit second outgoing messages to a second user-interface device at a fifth predefined time following a fourth predefined time during each of the sequential time intervals.

Additionally, during operation, the interface circuit may transmit second multicast messages to the user-interface devices at the fifth predefined time following the fourth predefined time during each of the sequential time intervals.

In some embodiments, the interface circuit includes: a processor; and a memory that stores an embedded operating system. During operation, the processor executes the embedded operating system and performs the operations of: transmitting the outgoing messages, receiving the incoming messages and transmitting the multicast messages.

Other embodiments provide a computer-program product for use with the interface circuit in the computing device. This computer-program product includes instructions for at least some of the aforementioned operations performed by the interface circuit.

Other embodiments provide a method for communicating with the user-interface devices via the link using the communication protocol, which may be performed by the interface circuit. During this method, the interface circuit performs at least some of the aforementioned operations.

In addition, the described embodiments relate to a user-interface device that includes: a user-interface component that, during operation, receives user-interface events from a user of the user-interface component; an antenna; and an interface circuit that, during operation, communicates with a computing device via a link using a communication protocol. Moreover, during operation, the interface circuit transitions from a sleep mode to a normal mode prior to a first predefined time during a first time interval in a sequence of time intervals. Then, the interface circuit receives incoming messages from the computing devices to user-interface devices at the first predefined time during the sequential time intervals, where a given incoming message at the first predefined time during a given sequential time interval is addressed to a given user-interface device. Next, the interface circuit transmits an outgoing message to the computing device at a second predefined time following the first predefined time during one of the sequential time intervals in which an incoming message addressed to the user-interface device was received at the first predefined time. Furthermore, the interface circuit receives multicast messages from the computing device to the user-interface devices at a third predefined time following the second predefined time during each of the sequential time intervals.

Additionally, during operation, when a given sequential time interval excludes a user-interface event, the interface circuit may transition from the normal mode to the sleep mode for the duration of the given sequential time interval after receiving a given multicast message during the given sequential time interval.

In some embodiments, during operation, the interface circuit transmits, in response to the incoming message, a second outgoing message to the computing device at a fourth predefined time after the third predefined time in one of the sequential time intervals.

Moreover, during operation, if a user-interface event has been received, the interface circuit may transmit data associated with the user-interface event in response to a first occurrence of: the incoming message addressed to the user-interface device at the first predefined time in the one of the sequential time intervals; or one of the multicast messages at the third predefined time.

In some embodiments, the interface circuit includes: a processor; and a memory that stores an embedded operating system. During operation, the processor executes the embedded operating system and performs the operations of: receiving the incoming messages, transmitting the outgoing message and receiving the multicast messages.

Note that one or more of the operations performed in the first group of embodiments may be performed in the second group of embodiments or vice versa.

Other embodiments provide a computer-program product for use with the interface circuit in the user-interface device. This computer-program product includes instructions for at least some of the aforementioned operations performed by the interface circuit.

Other embodiments provide a method for communicating with the computing device via the link using the communication protocol, which may be performed by the interface circuit in the user-interface device. During this method, the interface circuit performs at least some of the aforementioned operations.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
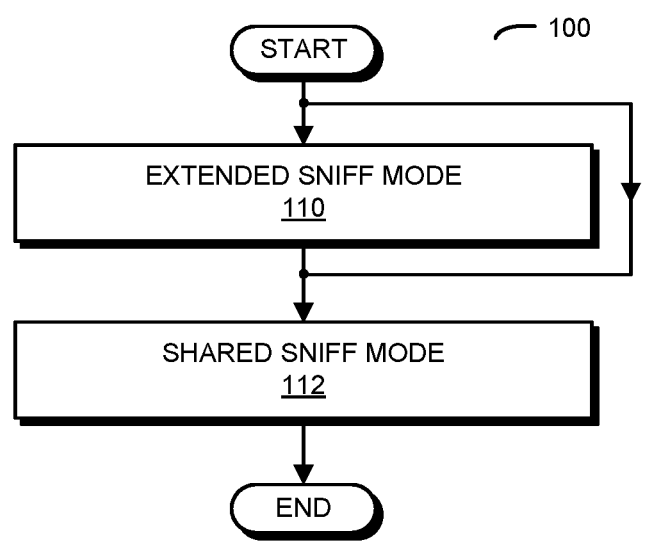
FIG. 1 is a flow diagram illustrating an example method for communicating with a computing device.

In order to reduce communication latency, in a first group of embodiments an interface circuit in a user-interface device may communicate with a computing device outside of reserved slots during a time interval. In particular, the interface circuit may transition from a sleep mode or other reduced power mode, to a normal mode or increased power mode prior to receiving an incoming message from the computing device at a first predefined time during the time interval. Then, the interface circuit may have the opportunity to transmit an outgoing message to the computing device at a second predefined time. When the outgoing message includes information specifying a user-interface event associated with a user-interface component in the user-interface device, the interface circuit may wait to receive a reply message from the computing device, e.g., with feedback based on the information. The user-interface device may wait in the higher power mode for up to the remaining duration of the time interval. Accordingly, the interface circuit of the user interface device may not transition to a relatively lower power mode, e.g., a sleep mode, after the transmit opportunity. Otherwise, the interface circuit may transition to the lower power mode for the remaining duration of the time interval.

In this way, this communication technique may improve the performance of the user-interface device or other such device implementing the technique. For example, after receiving the reply message with the feedback, the user-interface component may act on it, e.g., by providing the feedback to a user. By reducing the latency of the reply message by allowing communication during the time interval outside of reserved slots, the communication technique may improve the user's experience when using the user-interface device.

In a second group of embodiments, in order to reduce communication inefficiency, an interface circuit in a computing device communicates with user-interface devices using shared slots during time intervals. In some embodiments, a larger number of devices may be simultaneously connected than are simultaneously in active user. For example, a number of user-interface devices (e.g., peripheral devices), such as headsets, a keyboard, a mouse, a track pad, game controllers, and a remote control unit, all may be simultaneously connected to a computing device, but only a subset may be in use—and thus need to communicate, e.g., data—during any given time interval. Thus, efficiency can be gained by providing a flexible communication opportunity for devices that need to communicate, without reserving a time for each device in a given time interval. The computing device may transmit outgoing messages to the user-interface devices at a first predefined time during sequential time intervals when the user-interface devices transition from a sleep mode to a normal mode, where a given outgoing message at the first predefined time during a given sequential time interval is addressed to a given user-interface device. In response, the computing device may receive incoming messages from the user-interface devices at a second predefined time following the first predefined time during the sequential time intervals, where a given incoming message is received at the second predefined time during the given sequential time interval from the given user-interface device. Then, the computing device may transmit multicast messages to the user-interface devices at a third predefined time following the second predefined time during each of the sequential time intervals. Note that a given multicast message may be used to communicate data to one of the user-interface devices. Alternatively, in response to a given multicast message, one of the user-interface devices may communicate data to the computing device.

In this way, this second communication technique may improve the communication capacity or performance of a link between the computing device and the user-interface devices. For example, by sharing the slots during the sequential time intervals and using multicast messages, the second communication technique may reduce or eliminate overhead associated with the use of fixed or dedicated times for communication with a given user-interface device in each of the sequential time intervals. By reducing the inefficiency in the communication, the second communication technique may improve the communication performance without significantly increasing the communication latency between the computing device and the user-interface devices. Consequently, the second communication technique may improve the user's experience when using the computing device and/or the user-interface devices.

In general, the information communicated between a given user-interface device and the computing device (and, more generally, electronic devices) in the communication techniques may be conveyed in packets or frames (either or both of which are sometimes referred to as 'messages') that are transmitted and received by radios in electronic devices in accordance with a communication protocol, such as: an Institute of Electrical and Electronics Engineers (IEEE) 802.11 standard (which is sometimes referred to as 'Wi-Fi®'), Bluetooth® (from the Bluetooth Special Interest Group of Kirkland, Wash.), a cellular-telephone communication protocol and/or another type of wireless interface. In the discussion that follows, Bluetooth is used as an illustrative example.

We now describe embodiments of the communication techniques. FIG. 1 presents a flow chart illustrating method 100 with two modes of operation for electronic devices during the communication technique. In particular, in extended sniff mode 110, when a user-interface device transitions from a sleep mode to a normal mode during a sniff interval, and then transmits an outgoing message to a computing device with information specifying a time-sensitive event (such as a user-interface event), an interface circuit in the user-interface device may wait in the normal mode to receive a reply message from the computing device instead of transitioning back to the sleep mode. This extended sniff mode may reduce the communication latency between the user-interface device and the computing device.

Alternatively or additionally, in shared sniff mode 112, multicast messages may be transmitted from the computing device to two or more user-interface devices during a shared slot during a sniff interval, which may allow a user-interface device to transmit the outgoing message with the information specifying the time-sensitive event instead of waiting to use its reserved slot. This shared sniff mode may increase the communication efficiency while keeping communication latency bounded.

Note that extended sniff mode 110 and shared sniff mode 112 may be used separately or in conjunction with each other. Moreover, the decision to operate separately or in conjunction with each other may be dynamically configured, as needed, to improve communication efficiency and latency.

Figure 2:
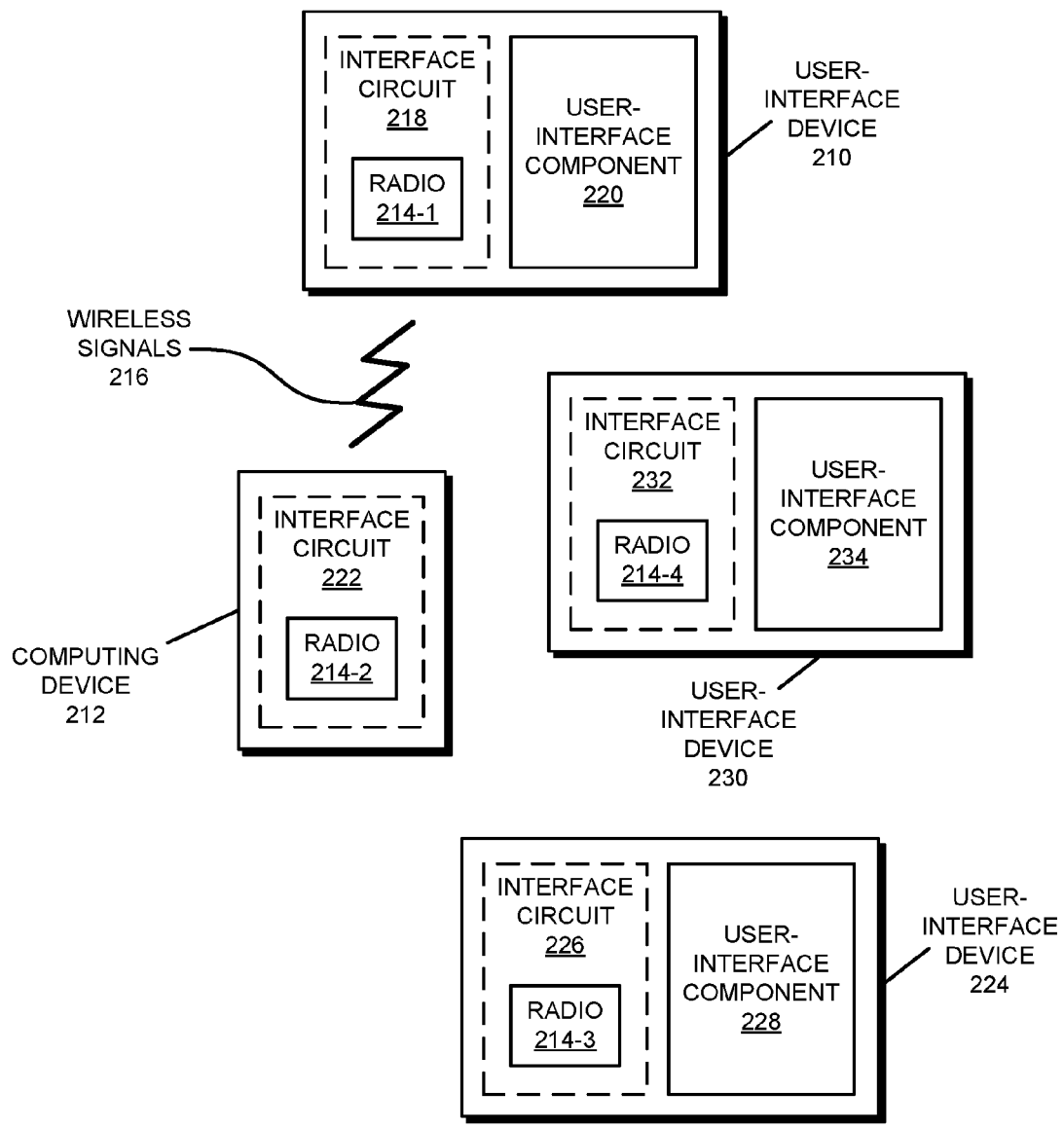
FIG. 2 is a block diagram illustrating example electronic devices wirelessly communicating.

The communication between the electronic devices is shown in FIG. 2, which presents a block diagram illustrating user-interface devices 210, 224 and 230 (which are sometimes referred to as 'human-interface devices') and computing device 212 wirelessly communicating. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include additional information, such as data, as payloads).

Figure 24:
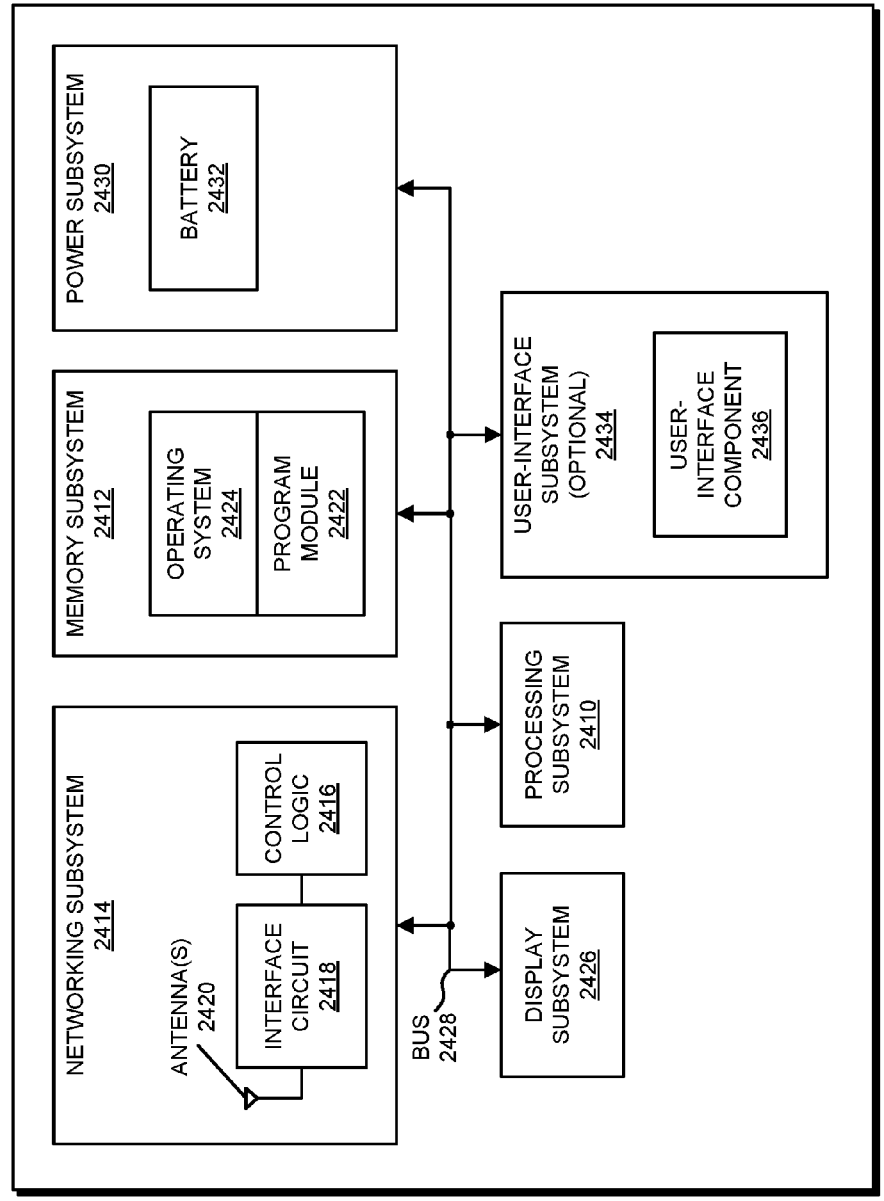
FIG. 24 is a block diagram illustrating one of the example electronic devices of FIG. 2.

As described further below with reference to FIG. 24, computing device 212 and user-interface devices 210, 224 and 230 may include subsystems, such as a networking subsystem, a memory subsystem and a processor subsystem. In addition, computing device 212 and user-interface devices 210, 224 and 230 may include radios 214 in the networking subsystems. More generally, computing device 212 and user-interface devices 210, 224 and 230 can include (or can be included within) any electronic devices with networking subsystems that enable computing device 212 and user-interface devices 210, 224 and 230 to wirelessly communicate with each other and/or another electronic device. This can comprise transmitting beacons on wireless channels to enable electronic devices to make initial contact with or detect each other, followed by exchanging subsequent data/management frames (such as connect requests) to establish a connection or link (which is sometimes referred to as a 'Bluetooth link'), configure security options (e.g., IPSec), transmit and receive packets or frames via the link, etc.

As can be seen in FIG. 2, wireless signals 216 (represented by a jagged line) are transmitted by a radio 214-1 in user-interface device 210. These wireless signals 216 are received by radio 214-2 in computing device 212. For example, user-interface device 210 may transmit packets, frames, etc. with information to computing device 212. Alternatively or additionally, computing device 212 may transmit packets, frames, etc. with information to user-interface device 210. Note that computing device 212 and user-interface devices 210, 224 and 230 can be embodied as any devices capable of communicating wirelessly. For example, in some embodiments, user-interface device 210 can be a trackpad, a mouse, a keyboard, or any other accessory device. Further, computing device 212 can be a laptop, notebook, desktop, server, tablet, wearable, or any other computing device. In some other embodiments, computing device 212 and user-interface devices 210, 224 and 230 can be any form of computing device or accessory capably of communicating wirelessly. Thus, while user-interface devices 210, 224 and 230 are used as illustrative examples, the communication techniques may be used with a wide variety of electronic devices.

In order to reduce power consumption while maintaining the connection or link with computing device 212, an interface circuit 218 in user-interface device 210 may operate in a sniff mode. During the sniff mode, interface circuit 218 may periodically (such as before a first predefined time or anchor point during a time interval or sniff interval) transition from a sleep or low-power mode to an active or normal mode. Then, interface circuit 218 may receive an incoming message from computing device 212 via a Bluetooth link at the first predefined time (which starts a reserved slot) and, at a second predefined time or anchor point (which starts another reserved slot), may transmit an outgoing message to computing device 212 via the Bluetooth link. In existing approaches, interface circuit 218 may subsequently transition back to the sleep mode until the predefined time during a subsequent sniff interval, e.g., at or after the next anchor point.

However, this approach may result in increased latency. For example, when a user provides a user-interface event using a user-interface component 220 in user-interface device 210, information specifying the user-interface event may be included in the outgoing message. For some user-interface components (such as a touchpad), computing device 212 may provide feedback associated with the user-interface event to user-interface device 210 in a reply message (e.g., computing device 212 may command user-interface device 210 to respond to the event, such as by generating output). When a command is received, the feedback may be output via user-interface component 220. For example, user-interface component 220 may provide the feedback to the user, e.g., in the form of one or more of haptic or force-based feedback (such as vibration), sound, light and/or another type of sensor feedback. If the feedback is not received until the incoming message in the subsequent sniff interval (e.g., 11.25 ms later), the delay or latency may be noticeable to the user and thereby may degrade the user's experience.

Figure 3:
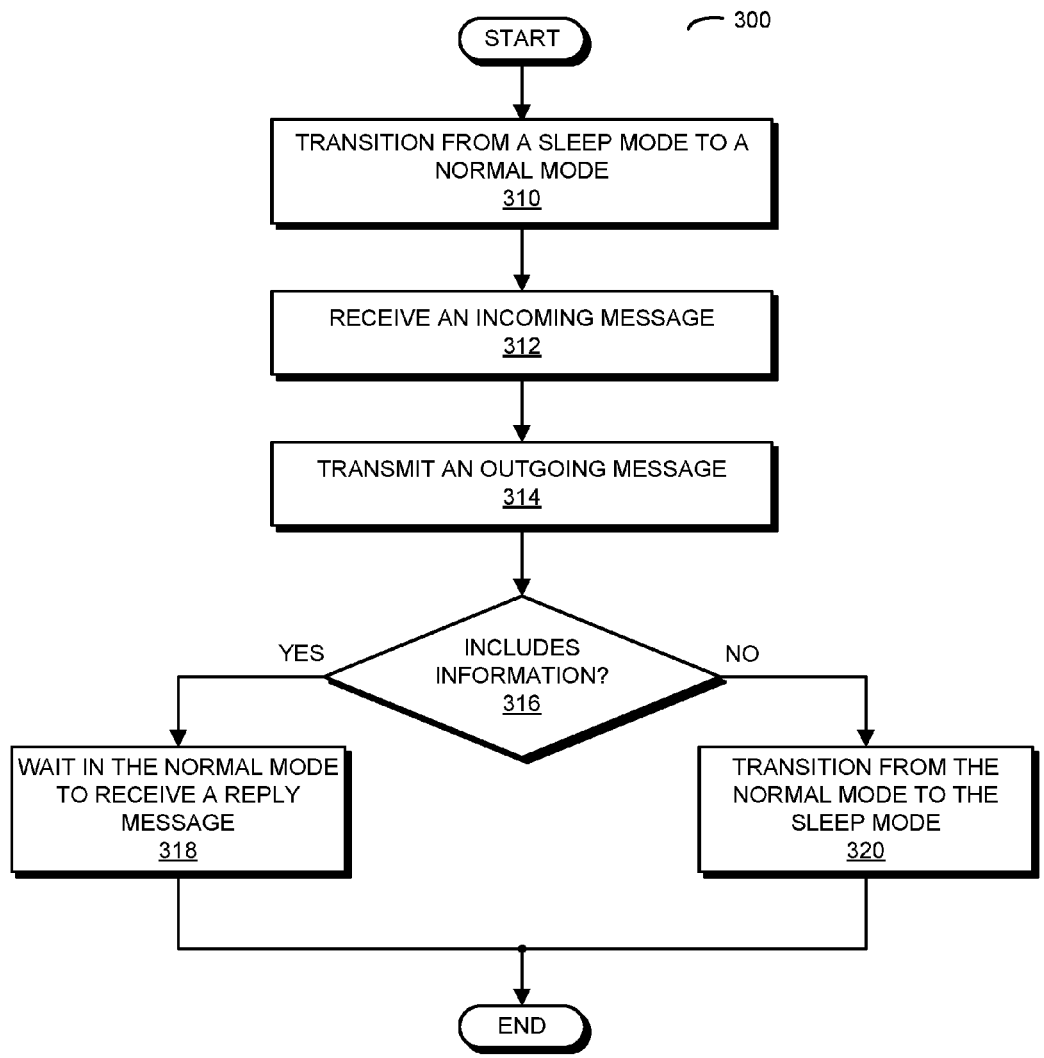
FIG. 3 is a flow diagram illustrating an example method for communicating with a computing device in FIG. 2 via a link using a communication technique.

In order to address this issue, user-interface devices 210, 224 and 230 and/or computing device 212 may perform the communication technique that includes the so-called 'extended sniff mode.' As described further below with reference to FIGS. 3-5, during this communication technique, when the outgoing message includes information specifying a time-sensitive event, such as a user-interface event, interface circuit 218 waits in the normal mode to receive the reply message from computing device 212, e.g., with the feedback based on the information. Interface circuit 218 may wait in the normal mode to receive the reply message until at most the second predefined time in a subsequent sniff interval. Typically, the feedback may be received within a couple of frames (some 2.5 ms). In some embodiments, interface circuit 218 only transmits the outgoing message once during the sniff interval. Alternatively, when the outgoing message excludes time-sensitive information, interface circuit 218 transitions from the normal mode to the sleep mode for the remaining duration of the sniff interval.

Note that interface circuit 218 may wait in the normal mode to receive the reply message based on one or more criteria, including a type of the user-interface component, and/or a type of the user-interface event. For example, interface circuit 218 may wait in the normal mode to receive the reply message for types of user-interface components that can provide the feedback to the user (such as a touchpad) and/or types of user-interface events (such as a double tap, a slide, a swipe that reaches a boundary, etc.) that may be associated with feedback. Other criteria can be specified for other types of devices and/or other types of events. Therefore, for types of user-interface components that cannot provide feedback and/or for types of user-interface events that are not associated with feedback (such as x, y position information), interface circuit 218 may transition from the normal mode to the sleep mode for the remaining duration of the sniff interval. In some embodiments, determining the type of the user-interface event may be performed by another component (such as a processor or a microcontroller) in user-interface device 210, other than interface circuit 218.

Similarly, during the communication technique, when computing device 212 receives the incoming message with the information specifying the user-interface event associated with user interaction with user-interface component 220, an interface circuit 222 in computing device 212 may: forward the information for further processing in computing device 212 (such as to a program module or an operating system that executes on computing device 212); receive the feedback from computing device 212 based on the information; and transmit a reply message to user-interface device 210 containing the feedback, such as in the form of a command, during the sniff interval. In some embodiments, interface circuit 222 only transmits the reply message once during the sniff interval. If the reply message is not acknowledged, interface circuit 222 may transmit the reply message again at the first predefined time in the subsequent sniff interval.

Note that interface circuit 222 may perform these operations based on any criteria, including a type of the user-interface component, and/or a type of the user-interface event. For example, interface circuit 222 may forward the information, receive the feedback and transmit the reply message for types of user-interface components that can provide the feedback to the user (such as a touchpad) and/or types of user-interface events (such as a double tap, a slide, a swipe that reaches a boundary, etc.) that may be associated with feedback. Therefore, for types of user-interface components that cannot provide the feedback and/or for types of user-interface events that are not associated with feedback (such as x, y position information), interface circuit 222 may not perform these operations. In some embodiments, determining the type of the user-interface event may be performed by another component (such as a processor or a microcontroller) in computing device 212 other than interface circuit 222.

Furthermore, during operation, interface circuit 222 may dynamically determine a priority of the reply message during the sniff interval relative to other types of communication handled by interface circuit 222. For example, the other types of communication may include communication with user-interface device 224 that includes user-interface component 228, e.g., via another Bluetooth link (using radio 214-3 in interface circuit 226) or with user-interface device 230 that includes user-interface component 234, e.g., via another Bluetooth link (using radio 214-4 in interface circuit 232), and the priority may be based on a type of user-interface component 228 or 234 relative to a type of user-interface component 220. In particular, communication with devices capable of generating output, such as touchpads, may be given priority over communication with other types of user-interface components, such as a keyboard and, then, a mouse. Alternatively or additionally, the other types of communication may include communication using another communication protocol, and the priority may be based on a type of the other communication protocol. For example, certain types of communication may be less sensitive to delays. In particular, music streaming or cellular-telephone communication may have a lower priority than the reply message, while certain Wi-Fi messages (such as those associated with a video phone call) may have higher priority than the reply message. For example, deferring communication for the lower priority cases may result in an additional delay or latency of 1.25 ms, which may be acceptable to the user.

In the described embodiments, processing a packet or frame in computing device 212, user-interface device 210, 224 or 230 includes: receiving wireless signals 216 with the packet or frame; decoding/extracting the packet or frame from received wireless signals 216 to acquire the packet or frame; and processing the packet or frame to determine information contained in the packet or frame (such as the information specifying the user-interface event, the feedback or additional information in the payload).

Although we describe the network environment shown in FIG. 2 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of a method. FIG. 3 presents a flow diagram illustrating method 300 for communicating with a computing device via a link using a communication protocol, which may be performed by an interface circuit in a user-interface device (such as user-interface device 210 in FIG. 2). During operation, the interface circuit transitions from a sleep mode to a normal mode (operation 310) prior to a first predefined time during a time interval. Then, the interface circuit listens for a command or incoming message during a first predefined time interval or window. If the incoming message is transmitted to the user-interface device, the interface circuit may receive an incoming message (operation 312) from the computing device at the first predefined time. Moreover, the interface circuit transmits an outgoing message (operation 314) to the computing device at a second predefined time. When the outgoing message includes information (operation 316) specifying a user-interface event, e.g., input that was received from a user of a user-interface component in the user-interface device, the interface circuit waits in the normal mode to receive a reply message (operation 318) from the computing device, where the reply message can include feedback based on the information. Otherwise, when the outgoing message does not include information specifying a user interface event (operation 316), the interface circuit transitions from the normal mode to the sleep mode (operation 320) for the remaining duration of the time interval.

Figure 4:
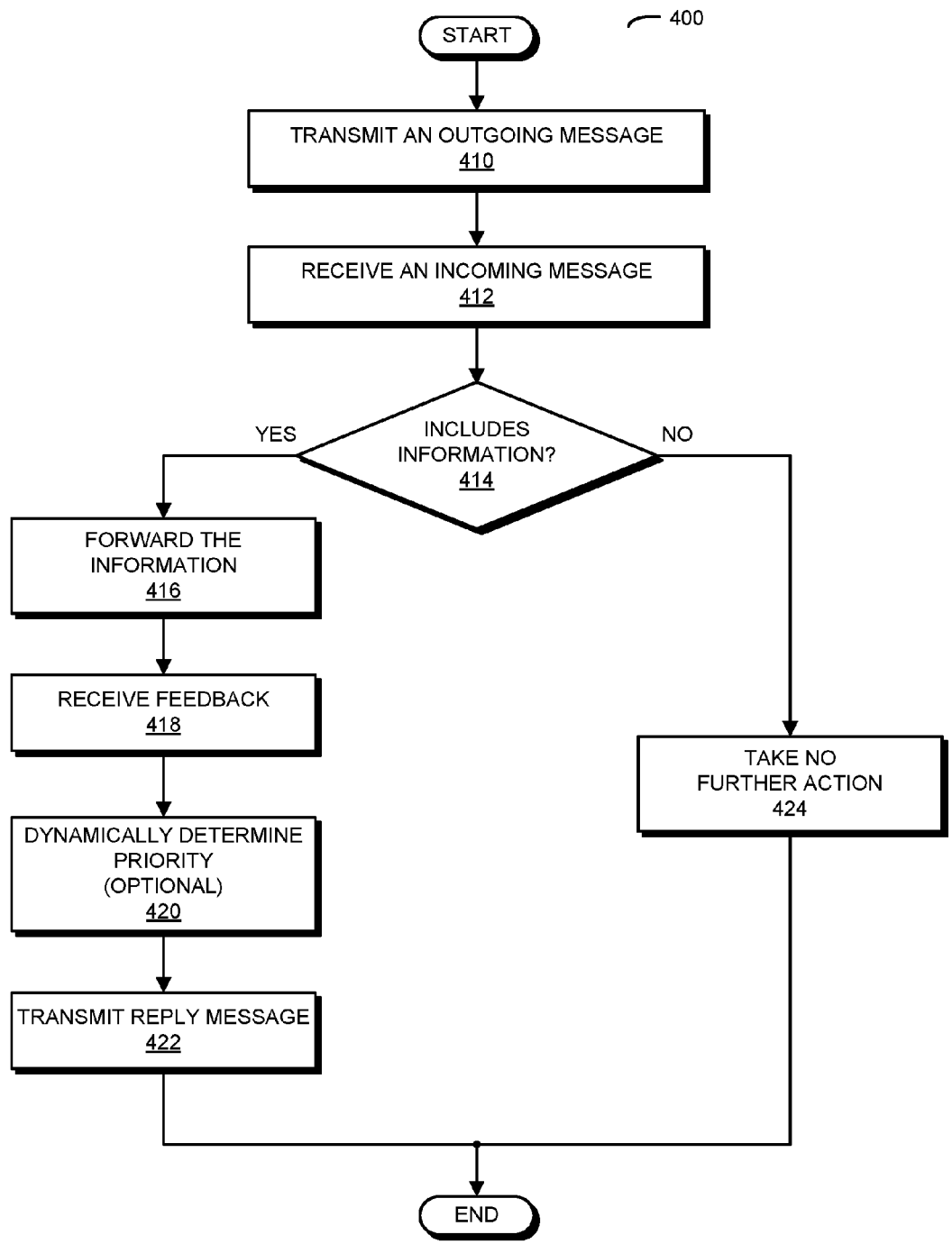
FIG. 4 is a flow diagram illustrating an example method for communicating with a user-interface device in FIG. 2 via the link using the communication technique.
Figure 5:
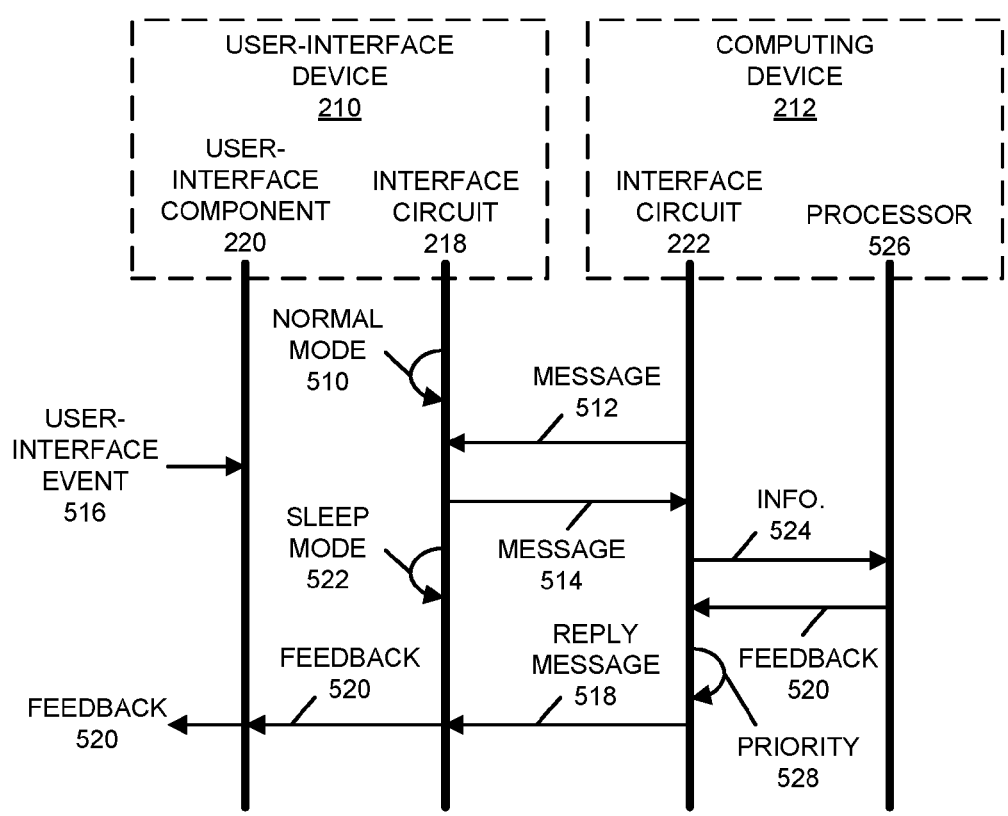
FIG. 5 is a diagram illustrating an example of communication between the user-interface device and the computing device of FIG. 2.

FIG. 4 presents a flow diagram illustrating example method 400 for communicating with a user-interface device via the link using the communication protocol, which may be performed by an interface circuit in a computing device (such as computing device 212 in FIG. 2). During operation, the interface circuit transmits an outgoing message (operation 410) to the user-interface device at the first predefined time during the time interval, e.g., when the user-interface device transitions from the sleep mode to the normal mode. Then, the interface circuit receives an incoming message (operation 412) from the user-interface device at the second predefined time, e.g., in response to the outgoing message. When the incoming message includes information (operation 414) specifying or otherwise identifying a user-interface event, e.g., associated with user interaction with the user-interface component in the user-interface device, the interface circuit: forwards the information (operation 416) for further processing in the computing device that includes the interface circuit; receives feedback (operation 418) from the computing device based on the information; and transmits the reply message (operation 422) to the user-interface device with the feedback during the time interval. Otherwise, if the incoming message does not include information indicating a user-interface event, (operation 414), the interface circuit takes no further action (operation 424) until the first predefined time in the next or subsequent time interval.

In some embodiments, prior to transmitting the reply message (operation 422), the interface circuit optionally determines a priority (operation 420) of the reply message relative to other types of communication handled by the interface circuit. Further, the determining can be performed dynamically. For example, the other types of communication may include communication with a second user-interface device that includes a second user-interface component via a second link using the communication protocol, and the priority may be based on a type of the second user-interface component. Alternatively or additionally, the other types of communication may include communication using another communication protocol, and the priority may be based on a type of the other communication protocol.

In an exemplary embodiment, at least some of the operations in method 300 are performed by an interface circuit in the user-interface device and at least some of the operations in method 400 are performed by an interface circuit in the computing device. For example, at least some of the operations may be performed by firmware executed by a processor in an interface circuit.

The communication technique is further illustrated in 5, which presents a drawing illustrating an example of communication between user-interface device 210 and computing device 212. In particular, interface circuit 218 in user-interface device 210 may transition from a sleep mode to a normal mode 510 prior to a first predefined time during a time interval, e.g., a sniff interval. Then, interface circuit 222 in computing device 212 transmits message 512 at the first predefined time, which is received by interface circuit 218. Next, interface circuit 218 transmits message 514 at the second predefined time, which is received by interface circuit 222.

If user-interface component 220 received a user-interface event 516 from a user prior to the transmission of message 514, information 524 specifying user-interface event 516 may be included in message 514. In this case, interface circuit 218 waits in normal mode 510 to receive a reply message 518 from computing device 212, where reply message 518 includes feedback 520 based on information 524. When interface circuit 218 receives reply message 518, user-interface component 220 may output feedback 520, e.g., to the user. Otherwise, when message 514 excludes information 524, interface circuit 218 transitions from normal mode 510 to sleep mode 522 for the duration of the time interval.

Similarly, when message 514 includes information 524, interface circuit 222: forwards information 524 to processor 526 for further processing; receives feedback 520 from processor 526; optionally dynamically determines a priority 528 of reply message 518; and transmits reply message 518 during the time interval. Otherwise, when message 514 excludes information 524, interface circuit 222 takes no further action until the first predefined time in the next or subsequent time interval.

In these ways, the communication technique may facilitate fast communication between user-interface device 210 and computing device 212, while providing the reduced power consumption associated with the sleep mode.

In some embodiments of the preceding methods, there may be additional or fewer operations. Moreover, the order of the operations may be changed, and/or two or more operations may be combined into a single operation.

Figure 6:
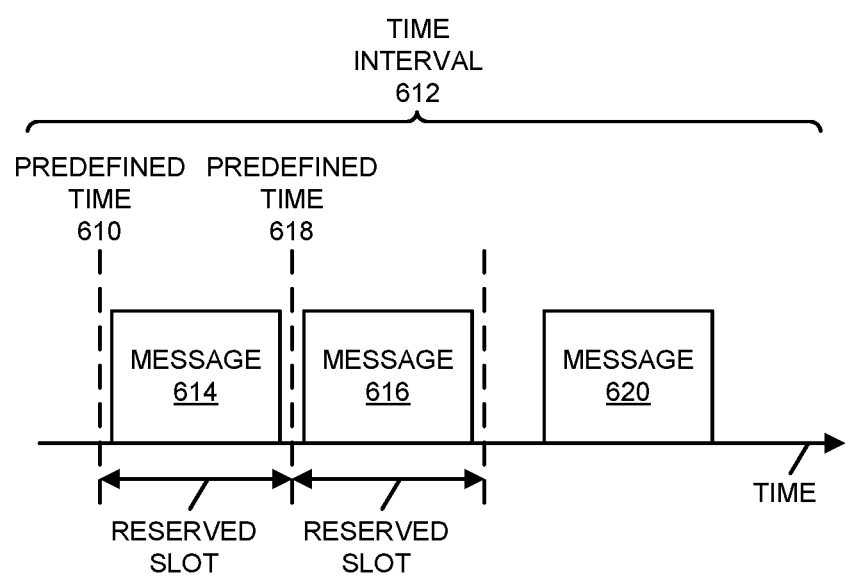
FIG. 6 is a timing diagram illustrating an example of communication between the user-interface device and the computing device of FIG. 2.

FIG. 6 presents a timing diagram illustrating communication between a user-interface device and a computing device. Prior to predefined time 610 (e.g., an anchor point) during time interval 612 (e.g., a sniff interval), an interface circuit in the user-interface device transitions from a sleep mode to a normal mode, where the normal mode represents a higher-power mode. Then, an interface circuit in the computing device transmits a message 614 to the user-interface device starting at predefined time 610. Then, the interface circuit in the user-interface device transmits a message 616 to the computing device starting at predefined time 618. If message 616 includes information specifying a user-interface event, the interface circuit in the computing device transmits reply message 620 to the user-interface device during time interval 612. After the interface circuit in the user-interface device receives reply message 620, it transitions from the normal mode to the sleep mode for the remaining duration of time interval 612. By remaining in the normal mode, the user-interface device can receive a message, such as a command to provide feedback, before the next time interval, thereby reducing the delay in performing an operation. For example, the user-interface device can provide the feedback In an exemplary embodiment, the extended sniff mode may allow the host (such as the computing device) to send data to a human-interface device or HID (such as the user-interface device) outside sniff reserved slots. Both the host and the HID application may tag their Bluetooth link as an extended sniff mode link to enable the Bluetooth controller to modify the sniff mode to support this feature. In particular, a Set_Extended_Sniff_Mode command may be used by the host to enable and configure or disable the extended sniff mode. The parameters for this command may include: a connection handle, an extended_sniff_enable, and an extended_sniff priority. Moreover, the connection handle may include two octets that indicate the connection handle of the Bluetooth link that uses the extended sniff mode. Furthermore, the extended_sniff_enable may include one octet, with a '0' indicating extended_sniff mode disable and a '1' indicating extended sniff mode enable. Additionally, the extended_sniff priority may include a one-octet bitmap that sets the priority of the reply message in the extended sniff mode: a '0' may indicate standard sniff priority (which may not preempt any other sniff link); bit 0 may indicate higher than sniff priority (which may preempt all other sniff links); bit 1 may indicate higher than a peer-to-peer Wi-Fi communication priority (which may preempt peer-to-peer Wi-Fi communication); bit 2 may indicate higher than a synchronous connection oriented or SCO link (which may preempt an SCO reserved slot); bit 3 may indicate higher priority than Bluetooth Low Energy (which may preempt Bluetooth Low Energy activities, such as advertising, scan and connection); and bits 4-7 may be reserved. Note that the Set_Extended_Sniff_Mode command may be sent multiple times to change the priority dynamically based on current Bluetooth use cases. The Bluetooth controller may send a command complete event in response to the Set_Extended_Sniff_Mode command.

If a Bluetooth link is tagged as having an extended_sniff mode, the host Bluetooth controller may send data received from the host during the next available Bluetooth frame. If the host data is transmitted outside the sniff reserved slot, the host may make only one attempt to transmit the data. If the data is not acknowledged by the HID, the data may be retransmitted at the next sniff anchor point.

The priority set by the host (e.g., using a vendor-specific code) may determine the next available frame. If the extended sniff mode is lower priority than peer-to-peer Wi-Fi communication, then the host Bluetooth controller may transmit the data packet after the peer-to-peer Wi-Fi communication is completed. Moreover, if the priority is set to be higher than other sniff links, SCO and peer-to-peer Wi-Fi communication, then the Bluetooth controller may preempt the other Bluetooth activity and may transmit the host data. The host may use a vendor-specific code to change the priority dynamically based on concurrent Bluetooth use cases.

Note that the host Bluetooth controller may have multiple sniff links at any given time. If the sniff intervals of various connections are multiples of each other, the host Bluetooth controller may place the sniff links in back-to-back frames to maximize the time allocated to Wi-Fi or other Bluetooth links. The extended sniff link may be scheduled first, followed by the rest of the sniff links. The host Bluetooth controller may preempt other sniff links based on the set priority.

We now describe embodiments of the second communication technique, which is sometimes referred to as a 'shared sniff mode.' When multiple electronic devices communicate using Bluetooth connections or when Bluetooth and Wi-Fi coexist in the 2.4 GHz frequency bands, there may not be sufficient communication capacity or bandwidth to communicate with all of the electronic devices. In this case, if the communication with one or more of the electronic devices is not intentionally degraded, there may be insufficient airtime available for the other electronic devices. This may degrade the communication performance of all of the electronic devices, which in turn may adversely impact the user experience when using the electronic devices.

In principle, there may be excess overhead associated with the sniff mode that can be used to improve the communication efficiency. For example, Bluetooth poll and null packets may use 126 μs out of the 625 μs, or 20% of a Bluetooth time slot (which is sometimes referred to as a 'slot'). If three user-interface devices (such as a keyboard, a mouse and a trackpad) are connected and idle, 10 out of 18 slots (or 55%) are 'reserved' for sniff mode. However, only five master-to-slave slots are used by the master to poll, while the slaves only respond every 500 ms (which is sometimes referred to as an 'asymmetric sniff'). Moreover, in every slave to master sniff slot, the master listens for a packet from the slave and opens the receiver for the duration of the packet preamble (68 μs) plus an uncertainty of ±10 μs to detect a packet. The efficiency is approximately $$\frac{5 \cdot 126 \text{ μs} + 5 \cdot 88 \text{ μs}}{6250 \text{ μs}} = 17\%.$$

Note that, if the mouse or the trackpad is moved by a user, a maximum of two of the ten slots are occupied by the slave with a data packet. Therefore, the efficiency is approximately $$\frac{5 \cdot 126 \text{ μs} + 3 \cdot 88 \text{ μs} + 2 \cdot 625 \text{ μs}}{6250 \text{ μs}} = 34\%.$$

As discussed previously, in the sniff mode, the computing device and a user-interface device communicate by sending packets at pre-defined sniff intervals. In between sniff intervals, the user-interface device can transition to a sleep mode to save energy. Note that the sniff interval may be selected in order to guarantee the required data rate and latency requirements of the user-interface device.

However, in order to save additional energy, user-interface devices in an idle mode often sleep for an extended time and may only answer every n-th packet (which is sometimes referred to as an 'asymmetric sniff, sniff sub-rating'). Note that a typical sub-rated sniff interval is 500 ms.

Moreover, the user-interface device may send HID reports to the computing device with information specifying: keystrokes, mouse clicks, mouse coordinates, multi-touch data and/or pressure readings. Furthermore, the computing device may occasionally send HID reports to the user-interface device to get further information (e.g., the battery level) or in order to control certain modes (e.g., suspend/resume). Additionally, link manager (LMP) messages may be used to update link parameters, e.g., an adaptive frequency-hopping schedule or map, sniff parameters and/or power control.

Figure 7:
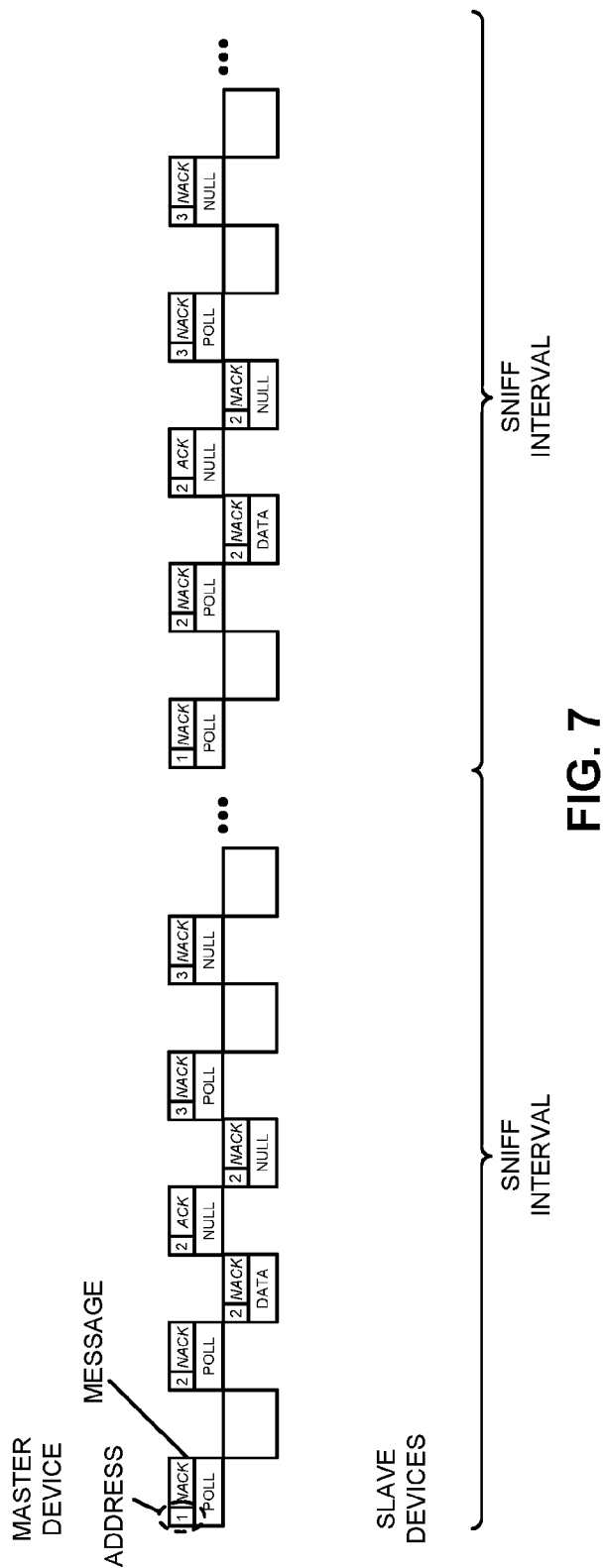
FIG. 7 is a timing diagram illustrating an example of communication between the user-interface device and the computing device of FIG. 2.

FIG. 7 presents a timing diagram illustrating communication between three user-interface devices (which are collectively referred to as 'slave devices') and a computing device (which is a 'master device'). For example, a first user-interface device may be a keyboard having address '1', a second user-interface device may be a mouse having address '2', and a third user-interface device may be a trackpad having address '3'. In FIG. 7, the mouse communicates data packets (such as a HID report, a HID control or an LMP message) during an 11.25 ms sniff interval, while the first and the third user-interface devices are in asymmetric sniff (and, thus, may only communicate a packet every 500 ms).

This inefficiency may provide an opportunity to reduce the communication overhead. In particular, assuming that only one user-interface device is used at any given time, the total reserved airtime for the user-interface devices can be reduced to four out of 18 slots (or an efficiency of 22%) if the four slots are shared by all of the user-interface devices. Therefore, in the example of FIG. 7, the reserved airtime would be reduced from 55% to 22%. However, the sharing may need to be performed in a way that preserves the 11.25 ms latency.

In this 'shared sniff mode,' sharing of sniff frames is enabled by assigning the same sniff offset (D_sniff) to all user-interface devices (and, more generally, electronic devices communicating with the computing device). Moreover, two sniff attempt frames may be configured to be shared by all the user-interface devices. In particular, the first sniff attempt frame may be used to address the user-interface devices sequentially in consecutive time intervals or sniff intervals. In addition, the second sniff attempt frame may be used to: address a specific user-interface device that needs an acknowledgment (ACK) for a previously sent data packet (e.g., by using the address of the specific user-interface device in the frame); address a specific user-interface device to which the computing device wants to send data (e.g., by using the address of the specific user-interface device in the frame); or send a multicast null packet (e.g., by using address equal to '0' in the frame) to enable any of the user-interface devices that receive the multicast null packet to respond and send data.

Referring back to FIG. 2, therefore, instead of using reserved slots that are fixed in time during each sniff interval for each of the user-interface devices 210, 224 and 230, in a first sniff attempt frame in a first sniff interval, computing device 212 may transmit a poll packet with a negative acknowledgment (NAK) addressed to user-interface device 210. In response, user-interface device 210 may transmit a null packet with an acknowledgment addressed to computing device 212. Then, in a second sniff attempt frame in the first sniff interval computing device 212 may transmit a null packet with an acknowledgment addressed to one of: an address of user-interface device 210, 224 or 230 if an acknowledgment is needed for a previously sent data packet; an address of user-interface device 210, 224 or 230 if computing device 212 wants to send data to user-interface device 210, 224 or 230; or an address of '0' for a multicast frame to user-interface devices 210, 224 and 230.

Next, in a first sniff attempt frame in a second sniff interval, computing device 212 may transmit a poll packet with a negative acknowledgment addressed to user-interface device 224. In response, user-interface device 224 may transmit a null packet with an acknowledgment addressed to computing device 212. Then, in a second sniff attempt frame in the first sniff interval, computing device 212 may transmit a null packet with an acknowledgment addressed to one of: an address of user-interface device 210, 224 or 230 if an acknowledgment is needed for a previously sent data packet; an address of user-interface device 210, 224 or 230 if computing device 212 wants to send data to user-interface device 210, 224 or 230; or an address of '0' for a multicast frame to user-interface devices 210, 224 and 230.

Thus, if user-interface devices 210, 224 and 230 are idle, computing device 212 may always send a multicast null packet in the second sniff attempt frame. Moreover, if one of user-interface devices 210, 224 and 230 becomes active, computing device 212 may address the active user interface device in the first sniff attempt frame (if it is the turn of the active user interface device) or in the next second sniff attempt frame (whichever comes first), thereby replacing the multicast packet. Furthermore, if computing device 212 has data for one of user-interface devices 210, 224 and 230, it may address this user-interface device on its next turn in the first sniff attempt frame or in the second sniff attempt frame, whichever comes first.

Figure 19:
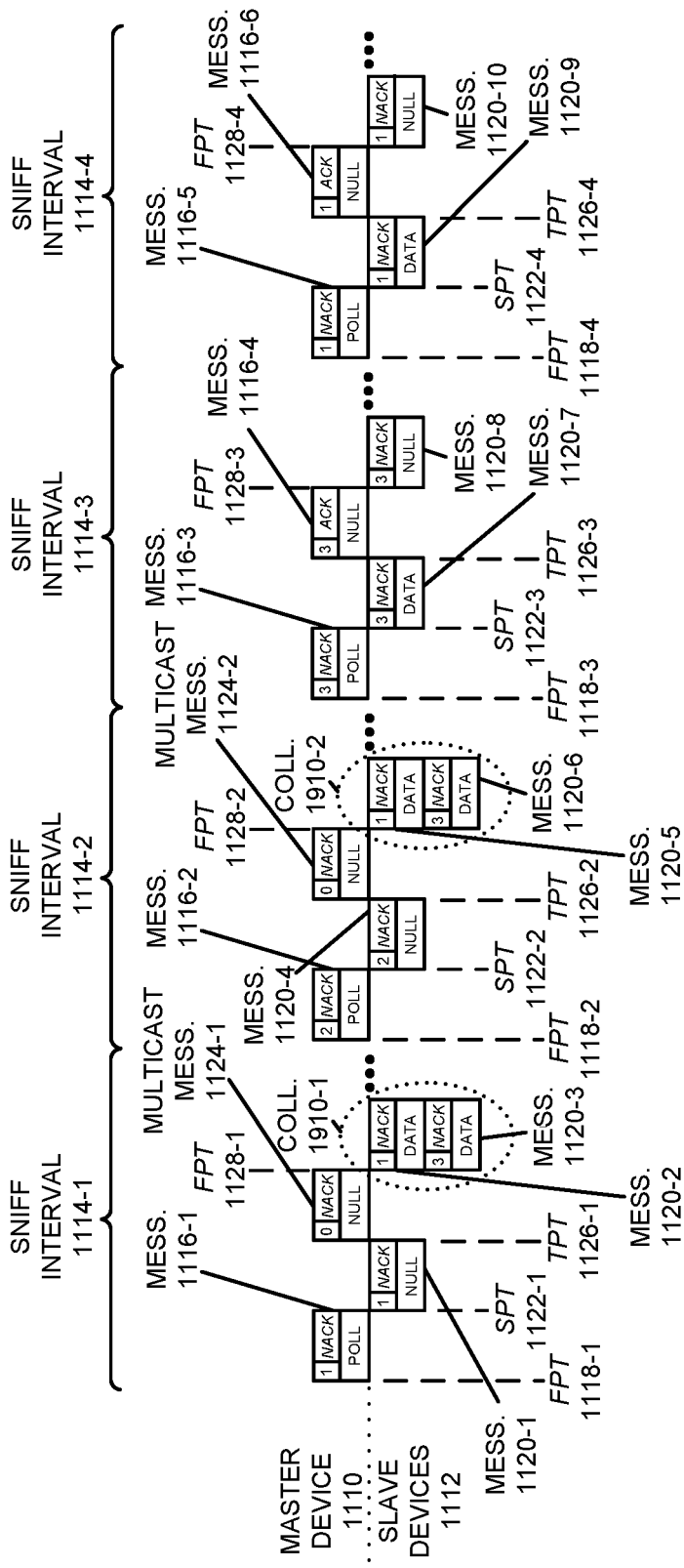
FIG. 19 is a timing diagram illustrating an example of communication between the user-interface devices and the computing device of FIG. 2.

In this way, the second communication technique may allow the user-interface devices 210, 224 and 230 and computing device 212 to communicate with each other efficiently and, as described further below with reference to FIG. 19, with acceptable latency. For example, the second communication technique may save 22-33% of the communication capacity or bandwidth. This approach may allow user-interface devices 210, 224 and 230 to save power in the sniff mode without degrading the communication performance or the user experience with using user-interface devices 210, 224 and 230 and/or computing device 212.

Figure 8:
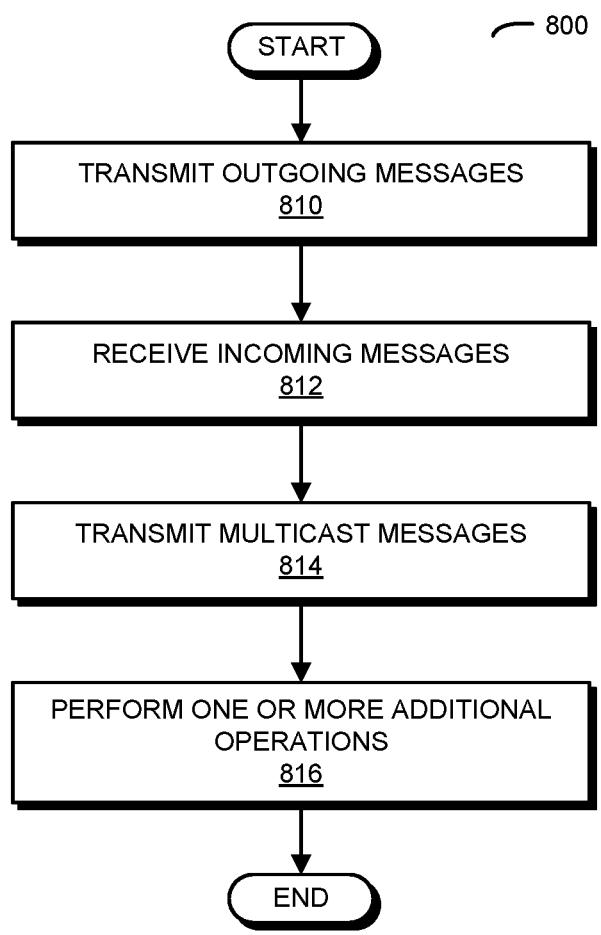
FIG. 8 is a flow diagram illustrating an example method for communicating with user-interface devices in FIG. 2 via a link using a second communication technique.

We now describe embodiments of a method. FIG. 8 presents a flow diagram illustrating method 800 for communicating with user-interface devices via a link using a communication protocol or technique, which may be performed by an interface circuit in a computing device (such as computing device 212 in FIG. 2). During operation, the interface circuit transmits outgoing messages (operation 810) to the user-interface devices at a first predefined time during sequential time intervals when the user-interface devices transition from a sleep mode to a normal mode, where a given outgoing message at the first predefined time during a given sequential time interval is addressed to a given user-interface device. Then, the interface circuit receives incoming messages (operation 812) from the user-interface devices at a second predefined time following the first predefined time during the sequential time intervals, where a given incoming message is received at the second predefined time during the given sequential time interval from the given user-interface device. Next, the interface circuit transmits multicast messages (operation 814) to the user-interface devices at a third predefined time following the second predefined time during each of the sequential time intervals.

Note that the communication protocol may include Bluetooth and the sequential time intervals may include sniff intervals.

Moreover, during operation the interface circuit may perform one or more additional operations (operation 816). For example (as described further below with reference to FIG. 13), in response to one of the multicast messages, the interface circuit may receive an incoming message from one of the user-interface devices at a fourth predefined time after the third predefined time in one of the sequential time intervals. If the incoming message includes data, the interface circuit may transmit an acknowledgment message to the one of the user-interface devices at the first predefined time in a subsequent time interval after the one of the sequential time intervals. For example, the acknowledgement bit in an outgoing message may be set to ACK. In some embodiments, the incoming message encompasses more than one time slot in the one of the sequential time intervals (as described further below with reference to FIG. 20).

Furthermore (as described further below with reference to FIG. 19), if, during operation, a collision occurs between the incoming message and a second incoming message, the interface circuit may sequentially poll the user-interface devices to receive the incoming message and the second incoming message without a subsequent collision.

Additionally, if, during operation, a number of collisions exceeds a threshold value, the interface circuit may transmit the outgoing messages at predefined times during each of the sequential time intervals and discontinues transmitting the multicast messages. Thus, if too many collisions occur, the interface circuit may, at least temporarily, revert to a sniff mode with fixed, reserved slots for communicating with specific user-interface devices.

As described further below with reference to FIG. 15, in some embodiments, when the interface circuit has data for one of the user-interface devices, the interface circuit transmits the data using a first occurrence of: an outgoing message at the first predefined time during one of the sequential time intervals addressed to the one of the user-interface devices; or instead of one of the multicast messages by replacing the multicast message address (LT_ADDR=0) with a message addressing the particular user-interface device.

Moreover, during operation, the interface circuit may communicate to the user-interface devices an adaptive frequency-hopping schedule and a future start time when the adaptive frequency-hopping schedule is used, so that the user-interface devices listen to correct frequencies during transmission of the multicast messages.

Furthermore, during operation, the interface circuit of the computing device may transmit second outgoing messages to a second user-interface device at a fifth predefined time following a fourth predefined time during each of the sequential time intervals. Thus, while the user-interface devices may use the shared sniff mode, the second user-interface device may use a fixed, reserved slot, e.g., in the sniff mode.

Additionally, during operation, the interface circuit may transmit second multicast messages to the user-interface devices at the fifth predefined time following the fourth predefined time during each of the sequential time intervals. Thus, there may be more than one multicast message communicated during each sniff interval.

Figure 9:
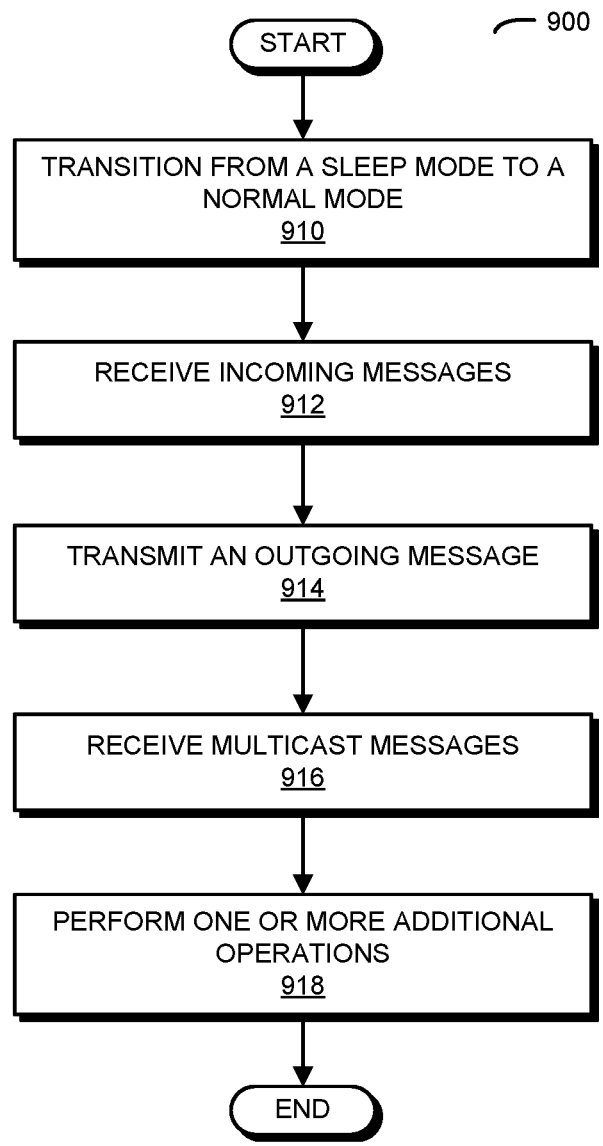
FIG. 9 is a flow diagram illustrating an example method for communicating with a computing device in FIG. 2 via the link using the second communication technique.

FIG. 9 presents a flow diagram illustrating example method 900 for communicating with a computing device via the link using the communication protocol, which may be performed by an interface circuit in a user-interface device (such as user-interface device 210, 224 or 230 in FIG. 2). During operation, the interface circuit transitions from a sleep mode to a normal mode (operation 910) prior to a first predefined time during a first time interval in a sequence of time intervals. Then, the interface circuit receives incoming messages (operation 912) from the computing devices to user-interface devices at the first predefined time during the sequential time intervals, where a given incoming message at the first predefined time during a given sequential time interval is addressed to a given user-interface device. Next, the interface circuit transmits an outgoing message (operation 914) to the computing device at a second predefined time following the first predefined time during one of the sequential time intervals in which an incoming message addressed to the user-interface device was received at the first predefined time. Furthermore, the interface circuit receives multicast messages (operation 916) from the computing device to the user-interface devices at a third predefined time following the second predefined time during each of the sequential time intervals.

Additionally, during operation, the interface circuit may perform one or more additional operations (operation 918). For example, when a given sequential time interval excludes a user-interface event, the interface circuit may transition from the normal mode to the sleep mode for the duration of the given sequential time interval after receiving a given multicast message during the given sequential time interval.

As described further below with reference to FIG. 12, in some embodiments the interface circuit transmits, in response to the incoming message, a second outgoing message to the computing device at a fourth predefined time after the third predefined time in one of the sequential time intervals.

Moreover, as is also described further below with reference to FIG. 12, if a user-interface event has been received, the interface circuit may transmit data associated with the user-interface event in response to a first occurrence of: the incoming message addressed to the user-interface device at the first predefined time in the one of the sequential time intervals; or one of the multicast messages at the third predefined time.

In an exemplary embodiment, at least some of the operations in method 800 are performed by an interface circuit in the computing device and at least some of the operations in method 900 are performed by an interface circuit in the user-interface device. For example, at least some of the operations may be performed by firmware executed by a processor in an interface circuit.

Figure 10:
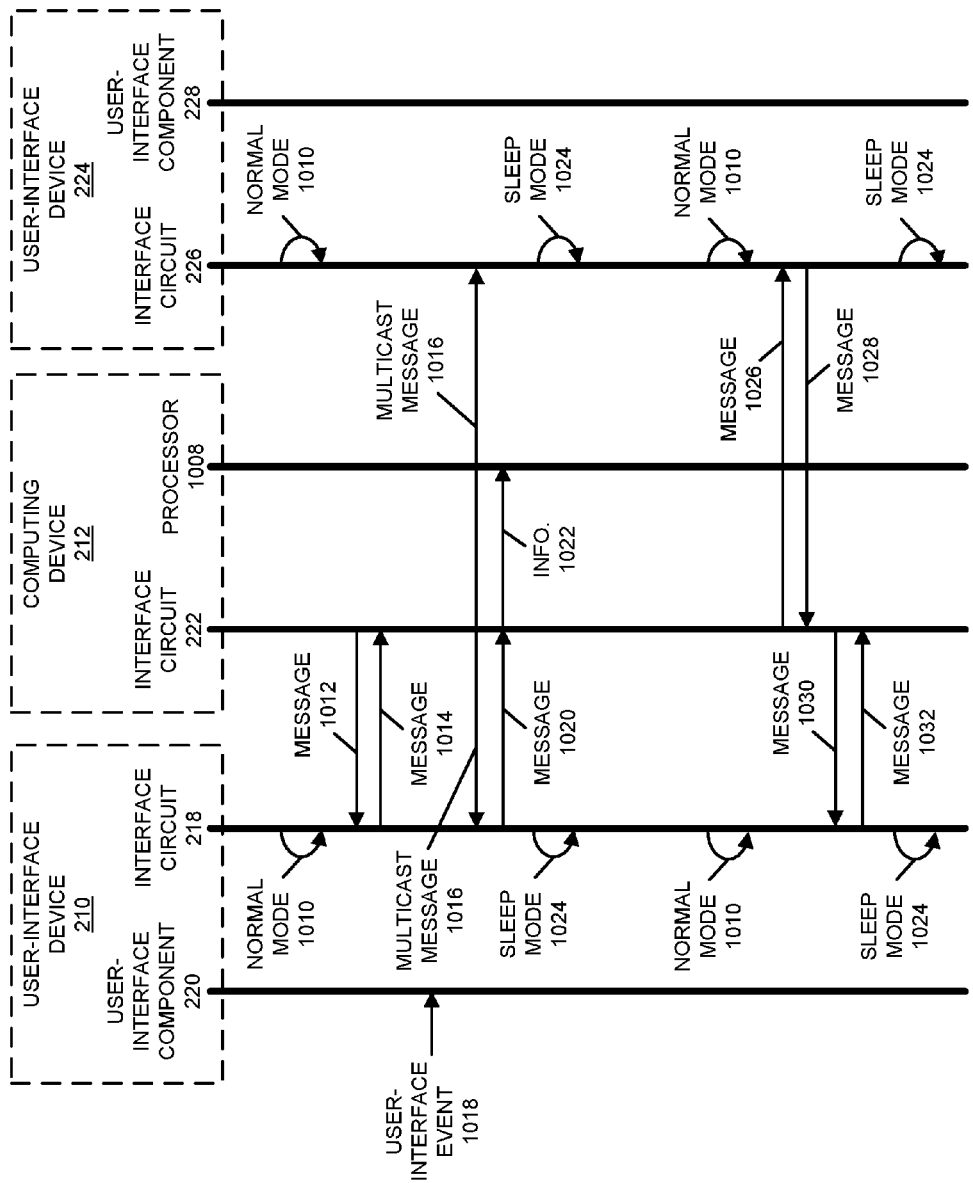
FIG. 10 is a diagram illustrating an example of communication between the user-interface devices and the computing device of FIG. 2.

The second communication technique is further illustrated in FIG. 10, which presents a drawing illustrating an example of communication between computing device 212 and user-interface devices 210, 224 and 230. In particular, interface circuit 218 in user-interface device 210 and/or interface circuit 226 in user-interface device 224 may transition from a sleep mode to a normal mode 1010 prior to a first predefined time during a time interval, e.g., a sniff interval. Then, interface circuit 222 in computing device 212 transmits message 1012 with a poll packet at the first predefined time, which is received by interface circuit 218. Next, interface circuit 218 transmits message 1014 with a null packet at the second predefined time, which is received by interface circuit 222.

Moreover, interface circuit 222 transmits multicast message 1016 with a null packet at the third predefined time. If user-interface device 210 has data (such as a HID report, a HID control or a LMP message) to communicate with computing device 212, interface circuit 218 may optionally transmit message 1020 with the data at the fourth predefined time. For example, if user-interface component 220 received a user-interface event 1018 from a user prior to the fourth predefined time, information 1022 specifying user-interface event 1018 may be included in message 1020 (which is received by interface circuit 222 and forwarded to processor 1008). Next, user-interface device 210 and/or interface circuit 218 may transition to sleep mode 1024.

In a subsequent time interval, user-interface device 210 may transition to normal mode 1010. Then, interface circuit 218 may receive a reply message 1030 from computing device 212 at the third predefined time in the subsequent time interval, where reply message 1030 includes at least an acknowledgment for message 1020. In response to reply message 1030, interface circuit 218 transmits message 1032 at a fourth predefined time in the subsequent time interval, where message 1032 includes at least a null acknowledgment for reply message 1030. Then, interface circuit 218 transitions to sleep mode 1024 for the duration of the subsequent time interval.

Furthermore, interface circuit 226 may transition from sleep mode 1024 to normal mode 1010 prior to the first predefined time during the subsequent time interval. Then, interface circuit 222 transmits message 1026 with a null packet at the first predefined time, which is received by interface circuit 226. Next, interface circuit 218 transmits message 1028 with a null packet at the second predefined time in the subsequent time interval, which is received by interface circuit 226. Because there is no multicast message in the subsequent time interval, interface circuit 226 then transitions to sleep mode 1024 for the duration of the subsequent time interval.

In these ways, the second communication technique may facilitate fast and efficient communication between computing device 212 and user-interface devices 210, 224 and 230, while providing the reduced power consumption associated with the sleep mode.

In some embodiments of the preceding methods, there may be additional or fewer operations. Moreover, the order of the operations may be changed, and/or two or more operations may be combined into a single operation.

Figure 11:
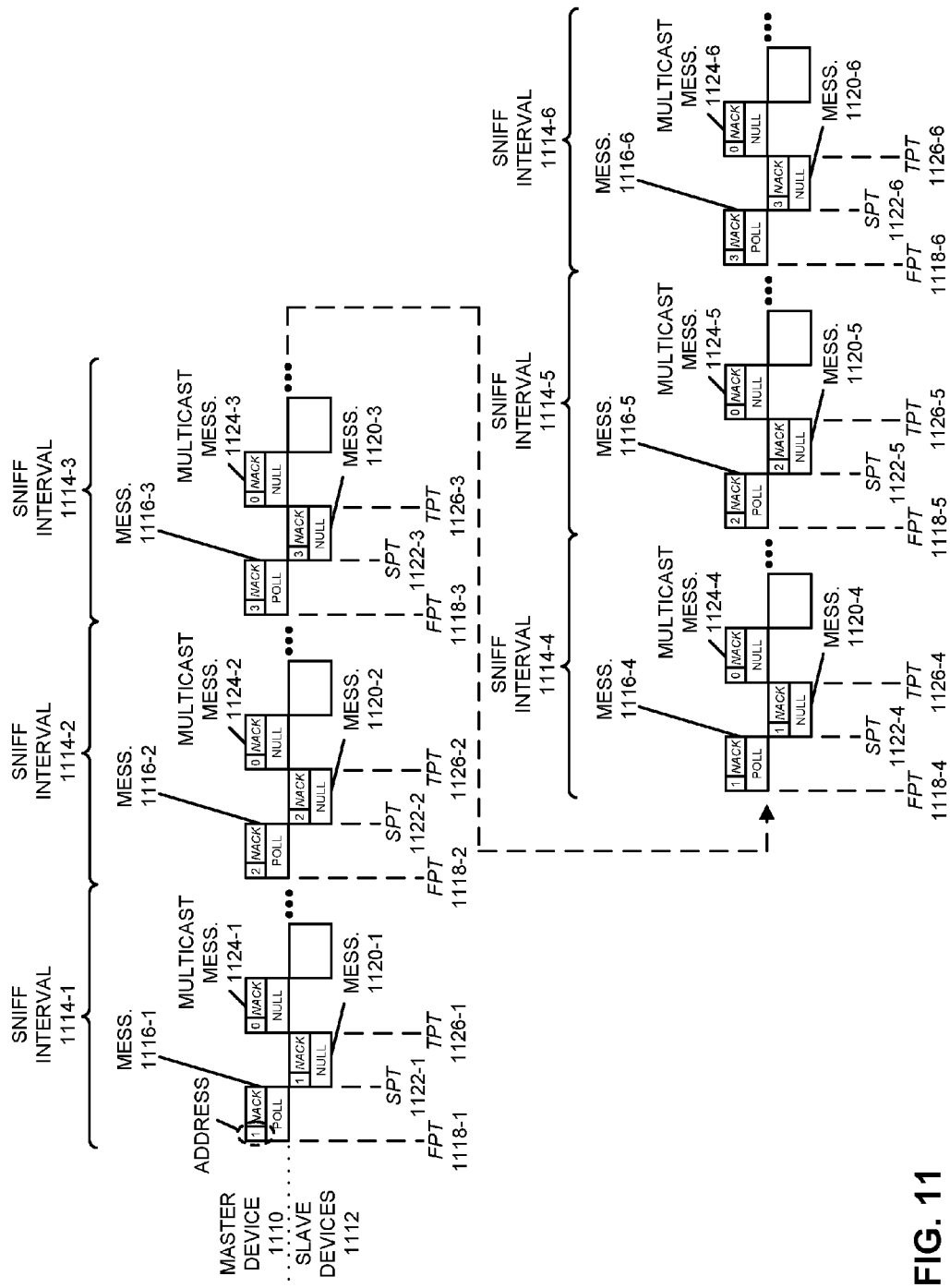
FIG. 11 is a timing diagram illustrating an example of communication between the user-interface devices and the computing device of FIG. 2.

We now describe exemplary embodiments of the second communication technique. FIG. 11 presents a timing diagram illustrating an example of communication between computing device 212 in FIG. 2 (which is master device 1110 in FIG. 11) and three 'slave devices' (which are denoted by slave devices 1112 in FIG. 11), including user-interface device 210 (having address '1'), user-interface device 224 (having address '2') and user-interface device 230 (having address '3'). In FIG. 11, the three slave devices 1112 are idle. Consequently, in consecutive sniff intervals in sniff intervals 1114, master device 1110 transmits one of messages 1116 with a poll packet addressed to one of the slave devices 1112 at instances of the first predefined time (FPT) 1118 (which correspond to sniff attempt frames). In response, the addressed slave device transmits one of reply messages 1120 with a null packet to master device 1110 at instances of the second predefined time (SPT) 1122. Then, master device 1110 transmits multicast messages 1124 with a null packet addressed to all of slave devices 1112 (address '0') at instances of the third predefined time (TPT) 1126, while all of slave devices 1112 listen. For example, in sniff interval 1114-1, master device 1110 polls user-interface device 210 (having address '1') by transmitting message 1116-1 at first predefined time 1118-1, user-interface device 210 transmits reply message 1120-1 at second predefined time 1122-1, and master device 1110 transmits multicast messages 1124 to all of slave devices 1112 at third predefined time 1126-1. Because slave devices 1112 are idle, there is no response to multicast messages 1124 at fourth predefined times 1128. This pattern cycles through all of the slave devices 1112 over three consecutive sniff intervals in sniff intervals 1114 and then repeats.

Figure 12:
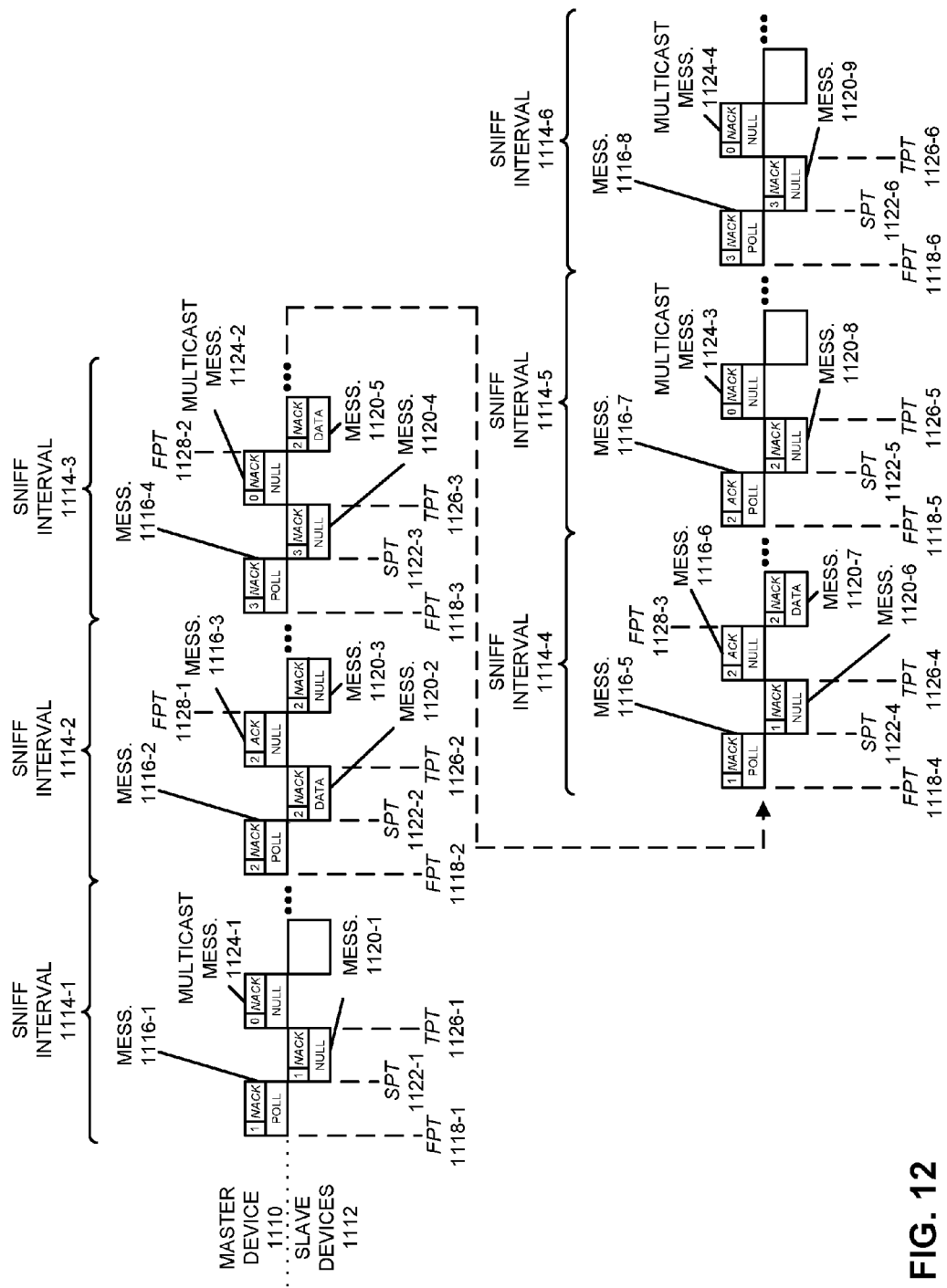
FIG. 12 is a timing diagram illustrating an example of communication between the user-interface devices and the computing device of FIG. 2.

Now, in FIG. 12, which presents a timing diagram illustrating an example of communication between master device 1110 and slave devices 1112, user-interface device 224 sends three data packets starting in the first sniff attempt frame in sniff interval 1114-2. In particular, in response to message 1116-2 with a poll packet in sniff interval 1114-2, user-interface device 224 transmits data packet in message 1120-2 at second predefined time 1122-2. Then, instead of an instance of multicast messages 1124, master device 1110 transmits message 1116-3 with a null packet and an acknowledgment at third predefined time 1126-2. Moreover, user-interface device 224 transmits reply message 1120-3 with a null packet at fourth predefined time (FPT) 1128-1.

Because user-interface device 230 is addressed in message 1116-4 in sniff interval 1114-3, user-interface device 224 transmits a data packet in message 1120-5 at fourth predefined time 1128-2 in response to multicast messages 1124-2. Moreover, instead of an instance of multicast messages 1124, receipt of this data packet is acknowledged in message 1116-6 at third predefined time 1126-4.

Furthermore, user-interface device 224 transmits a data packet in message 1120-7 at fourth predefined time 1128-3. Master device 1110 acknowledges receipt of this data packet in message 1116-7 at first predefined time 1118-5 because user-interface device 224 is already supposed to be addressed in this message.

Figure 13:
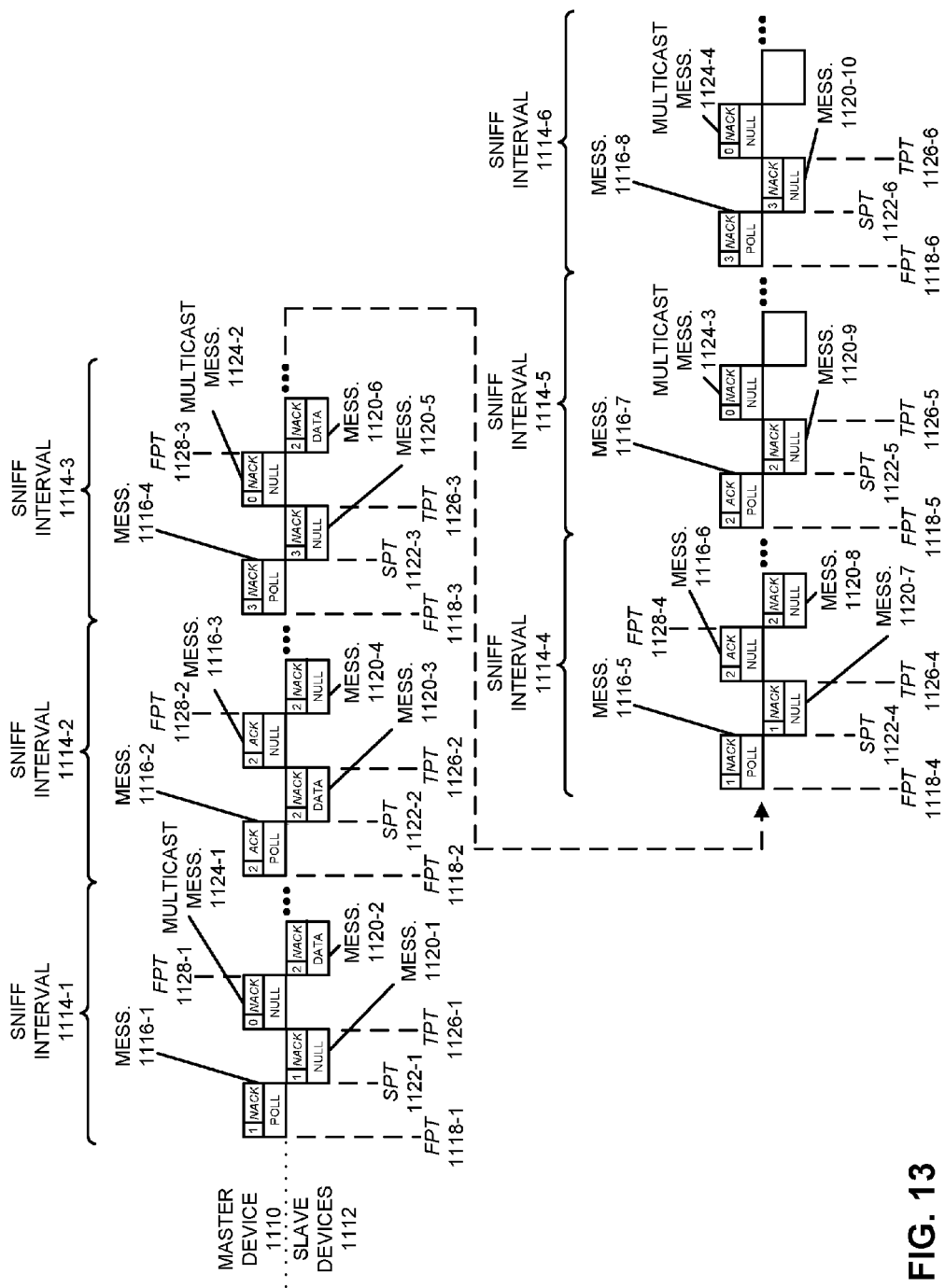
FIG. 13 is a timing diagram illustrating an example of communication between the user-interface devices and the computing device of FIG. 2.

In FIG. 13, which presents a timing diagram illustrating an example of communication between master device 1110 and slave devices 1112, user-interface device 224 sends three data packets starting in the second sniff attempt frame in sniff interval 1114-1. In particular, a data packet is sent in message 1120-2 at fourth predefined time 1128-1 in response to multicast message 1124-1 at third predefined time 1126-1. Because user-interface device 224 is addressed in message 1116-2 at first predefined time 1118-2, a data packet is sent in message 1120-3 at second predefined time 1122-2. Then, in response to multicast message 1124-2 at third predefined time 1126-3, a data packet is sent in message 1120-6 at fourth predefined time 1128-3.

Figure 14:
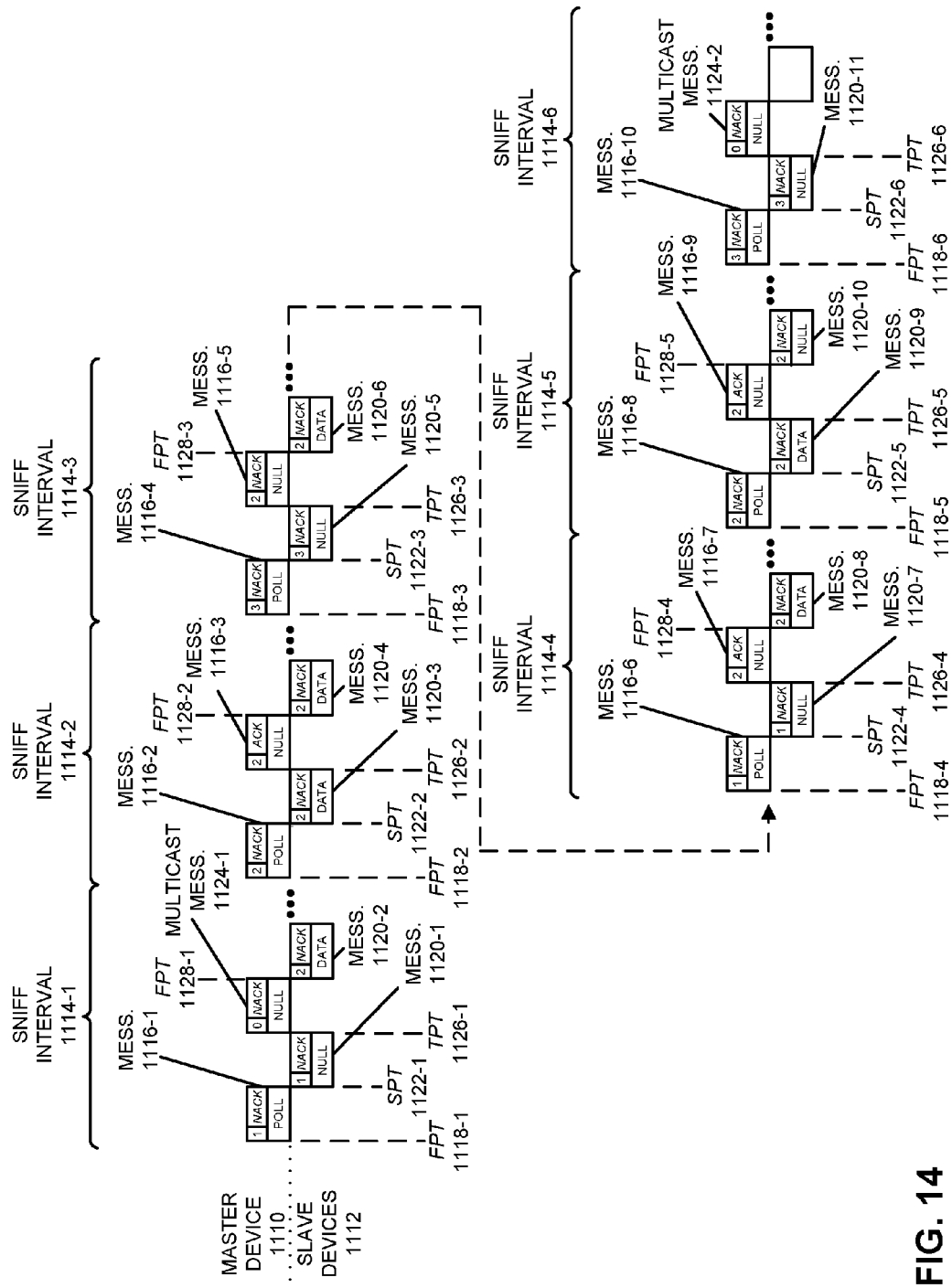
FIG. 14 is a timing diagram illustrating an example of communication between the user-interface devices and the computing device of FIG. 2.
Figure 15:
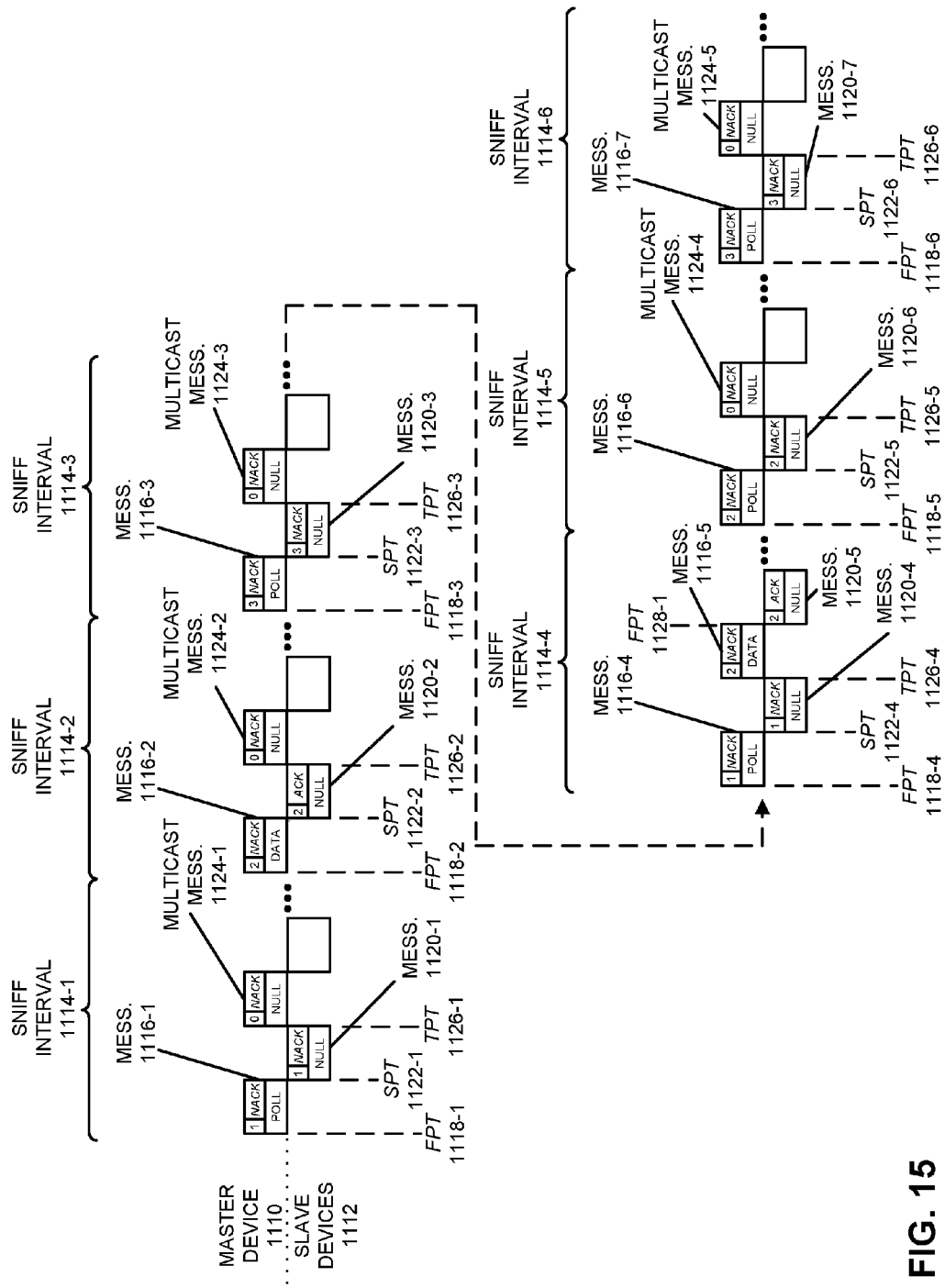
FIG. 15 is a timing diagram illustrating an example of communication between the user-interface devices and the computing device of FIG. 2.
Figure 16:
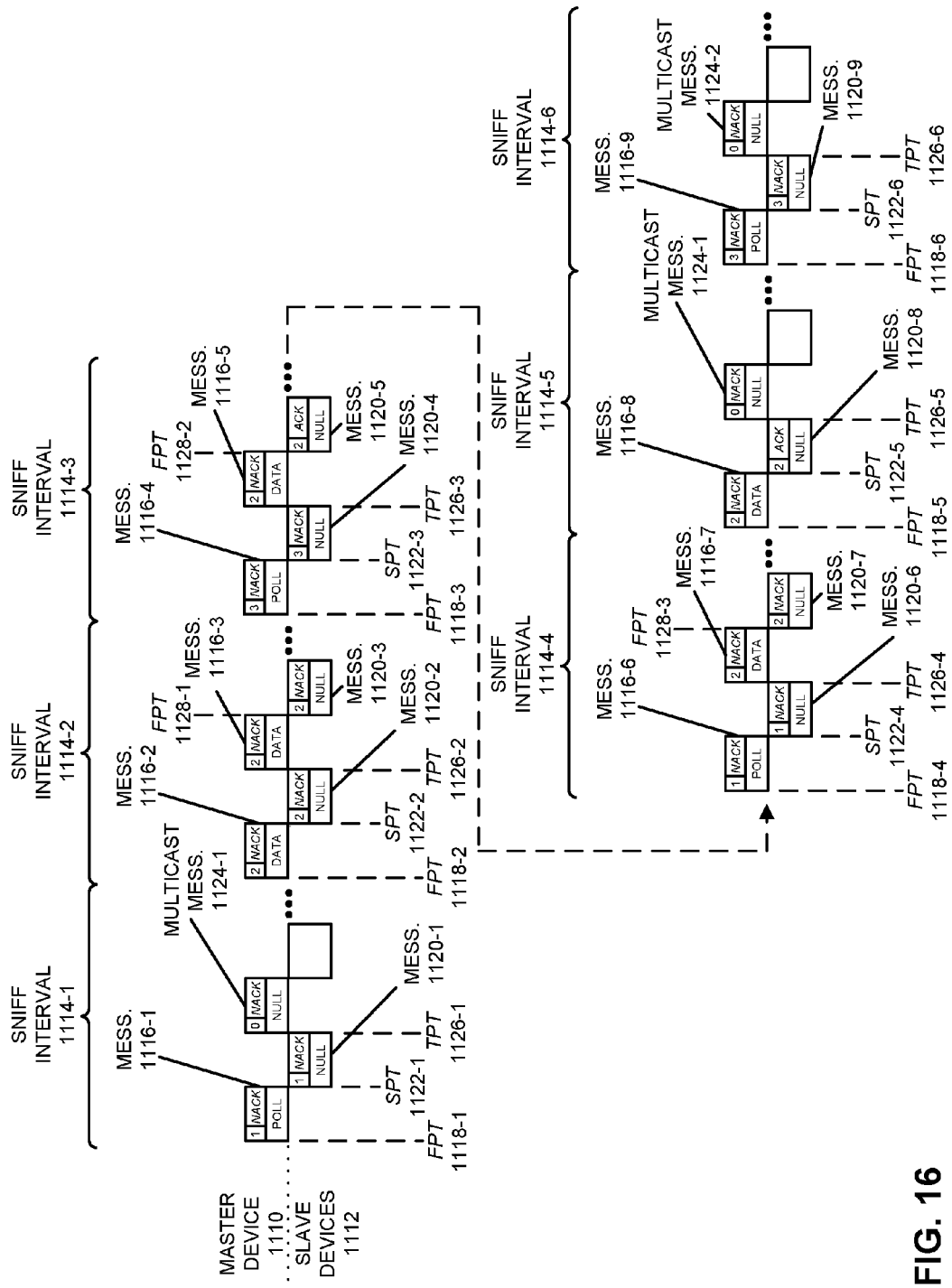
FIG. 16 is a timing diagram illustrating an example of communication between the user-interface devices and the computing device of FIG. 2.

Additional examples are shown in FIGS. 14-16. In particular, in FIG. 14, which presents a timing diagram illustrating an example of communication between master device 1110 and slave devices 1112, user-interface device 224 sends three data packets starting in the second sniff attempt frame in sniff interval 1114-1. However, the first data packet in message 1120-2 is not received correctly (as indicated by the null acknowledgment in message 1116-2). Consequently, user-interface device 224 resends this data packet in message 1120-3 and then, in response to message 1116-3, sends the second data packet in message 1120-4.

Once again, the second data packet is not received correctly (as indicated by the null acknowledgment in message 1116-5). Therefore, the second data packet is resent in message 1120-6. This data packet is received correctly (as indicated by the acknowledgment in message 1116-7). However, the third data packet in message 1120-8 is not received correctly (as indicated by the null acknowledgment in message 1116-8), so the third data packet is resent in message 1120-9. This data packet is received correctly (as indicated by the acknowledgment in message 1116-9).

In FIG. 15, which presents a timing diagram illustrating an example of communication between master device 1110 and slave devices 1112, computing device 212 sends data packets to user-interface device 224. In particular, a data packet is sent in message 1116-2, which is acknowledged in message 1120-2. Then, instead of an instance of multicast messages 1124, a data packet is sent in message 1116-5, which is acknowledged in message 1120-5.

Moreover, in FIG. 16, which presents a timing diagram illustrating an example of communication between master device 1110 and slave devices 1112, a data packet is sent in message 1116-2. However, this data packet is not received correctly (as indicated by null acknowledgment in message 1120-2). Therefore, the data packet is resent in message 1116-3, but once again it is not received correctly. At the next opportunity, instead of an instance of multicast messages 1124, the data packet is resent again in message 1116-5. This data packet is received correctly. Similarly, a second data packet is sent in message 1116-7, but is not received correctly. Consequently, the second data packet is resent in message 1116-8, and the second data packet is finally received correctly.

Figure 17:
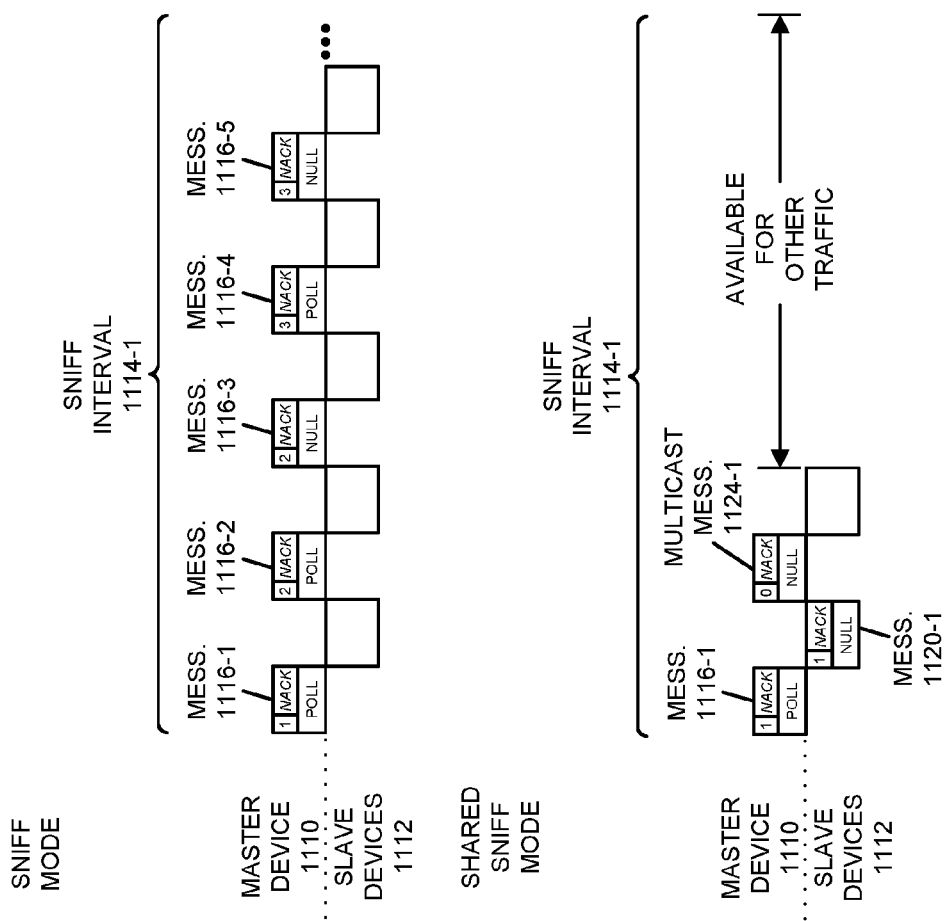
FIG. 17 is a timing diagram illustrating an example of communication between the user-interface devices and the computing device of FIG. 2.
Figure 18:
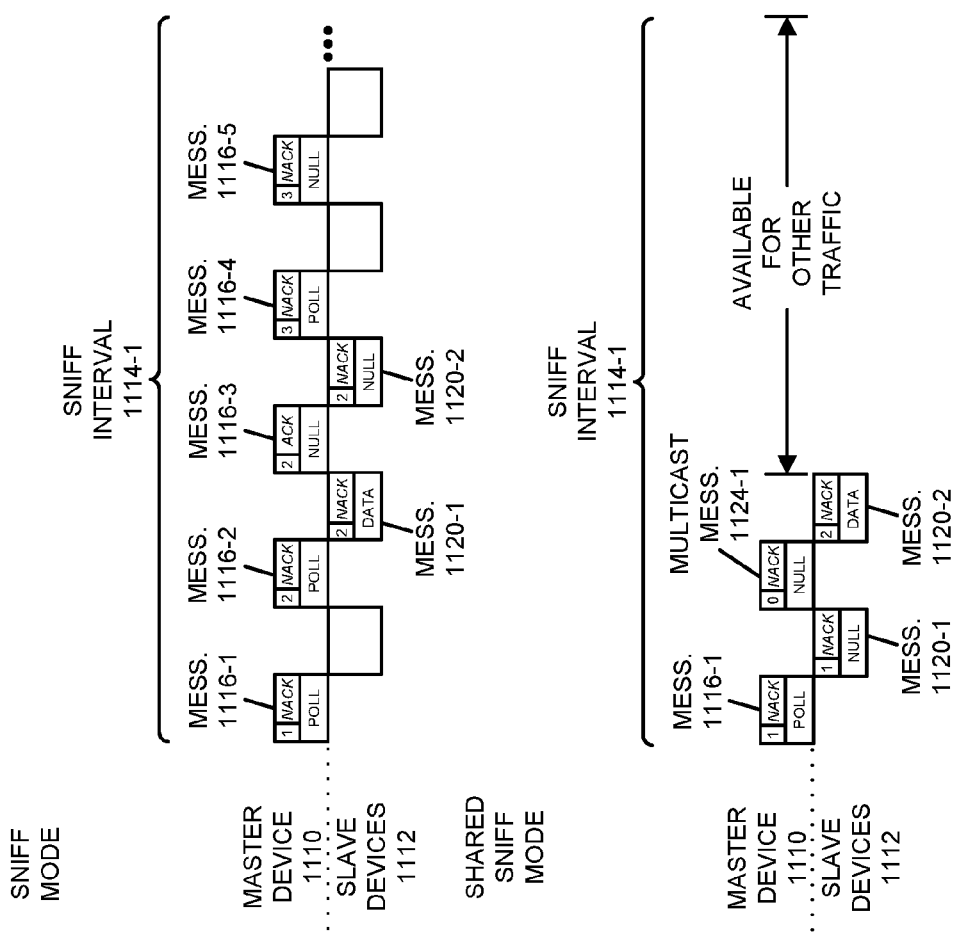
FIG. 18 is a timing diagram illustrating an example of communication between the user-interface devices and the computing device of FIG. 2.

FIGS. 17 and 18 present timing diagrams illustrating examples of communication master device 1110 and slave devices 1112. In particular, in FIG. 17 the benefit of the shared sniff mode relative to the sniff mode is illustrated when all three slave devices 1112 are idle. Moreover, FIG. 18 illustrates the benefit of the shared sniff mode relative to the sniff mode when user-interface device 224 is sending data packets to computing device 212.

The shared sniff mode may ensure that all of the user-interface devices are regularly polled. For example, for N user-interface devices and a sniff interval of 11.25 ms, each of the user-interface devices may be polled within 11.25·N ms. Moreover, the user-interface-device latency of 11.25 ms (and, more generally, the duration of the sniff interval) may be preserved by enabling a user-interface device to send data in the next multicast frame.

In principle, the latency may be slightly increased if more than one user-interface device responds to a multicast packet and the reply messages collide. In this case, another attempt may be made in the next multicast frame in the subsequent sniff interval. In the worst case, the user-interface device may have to wait until its next turn in the first sniff attempt frame (when it will be addressed directly when the computing device sends a polling message to it).

In some embodiments, when too many collisions occur (such as a number of collisions exceeding a threshold value), the computing device may poll the user-interface devices individually. This is shown in FIG. 19, which presents a timing diagram illustrating an example of communication between master device 1110 and slave devices 1112. In particular, when collisions 1910 occur in response to multicast messages 1124-1 and 1124-2, master device 1110 may sequentially poll the user-interface devices. For example, in sniff interval 1114-3, master device 1110 may poll and then receive a data packet from user-interface device 230. Moreover, in sniff interval 1114-4, master device 1110 may poll and then receive a data packet from user-interface device 210.

Note that the user-interface devices may potentially have different adaptive-frequency-hopping maps or schedules. This is not a problem for frames in which the user-interface devices are specifically addressed (e.g., for messages 1116 in FIGS. 11-19). However, for multicast frames all of the user-interface devices may need to listen on the same channel, i.e., all of the user-interface devices using the shared sniff mode may need to have the same adaptive-frequency-hopping schedule.

One approach to solving this problem is to use an adaptive-frequency-hopping schedule update that sends a new adaptive-frequency-hopping schedule to all of the user-interface devices sequentially. Moreover, the adaptive-frequency-hopping schedule update may choose or specify an adaptive-frequency-hopping-schedule switch time or instant in the future (such as at least tens of milliseconds in the future), so that all the user-interface devices switch to the new adaptive-frequency-hopping schedule at the same time.

Note that if all the user-interface devices are idle and in the asymmetric sniff mode, they may only wake up and listen every 500 ms. In order to perform an adaptive-frequency-hopping schedule update on three idle user-interface devices, the adaptive-frequency-hopping-schedule switch time may have to be scheduled more than 1.5 s in the future.

Figure 20:
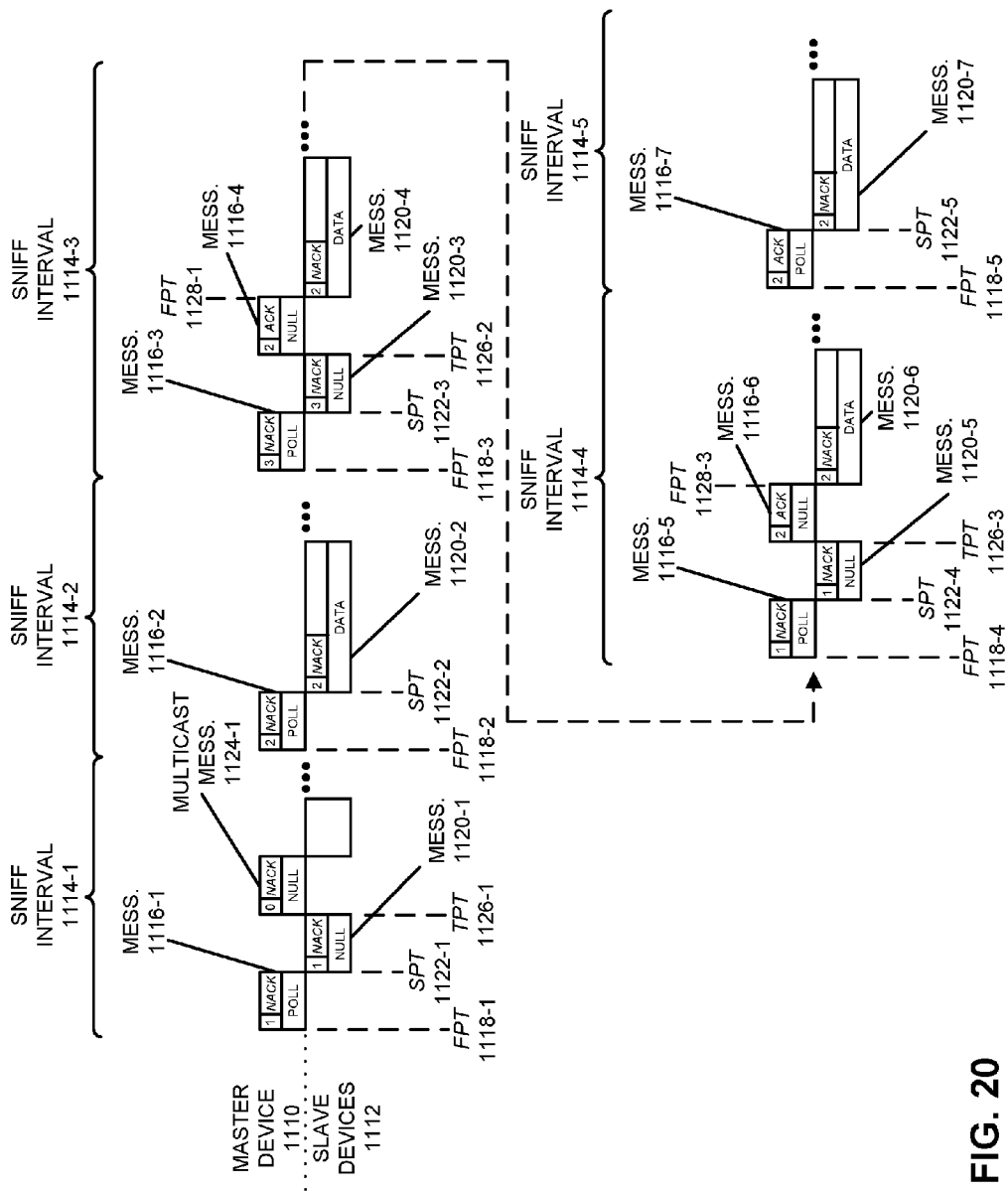
FIG. 20 is a timing diagram illustrating an example of communication between the user-interface devices and the computing device of FIG. 2.

In some embodiments, messages with data packets extend over multiple slots. In particular, the HID reports from certain user-interface devices (such as trackpads) can be large depending on the user's gestures and, thus, may not fit into a single-slot packet. For example, three-slot or five-slot packets may be used in this case. (Although, in other embodiments an enhanced data rate may allow all the packets to be sent in a single frame.) This is shown in FIG. 20, which presents a timing diagram illustrating an example of communication between master device 1110 and slave devices 1112. In sniff interval 1114-2, in response to message 1116-2 in the first sniff attempt frame, message 1120-2 extends into the second sniff attempt frame. Therefore, the second sniff attempt frames may be extended to two or more slots (such as three slots).

Furthermore, in some embodiments collisions occur between particular user-interface devices. For example, collisions may occur mainly between a keyboard and pointing devices, such as a mouse and a trackpad. Consequently, the pointing devices may be prioritized when resolving collisions to preserve the latency requirements of the pointing devices.

Note that, if a collision occurs in a multicast frame, there may be a high probability that a collision will occur again in the following multicast frames. In order to avoid this, the collision may need to be resolved as soon as possible, e.g., in the next sniff interval.

Figure 21:
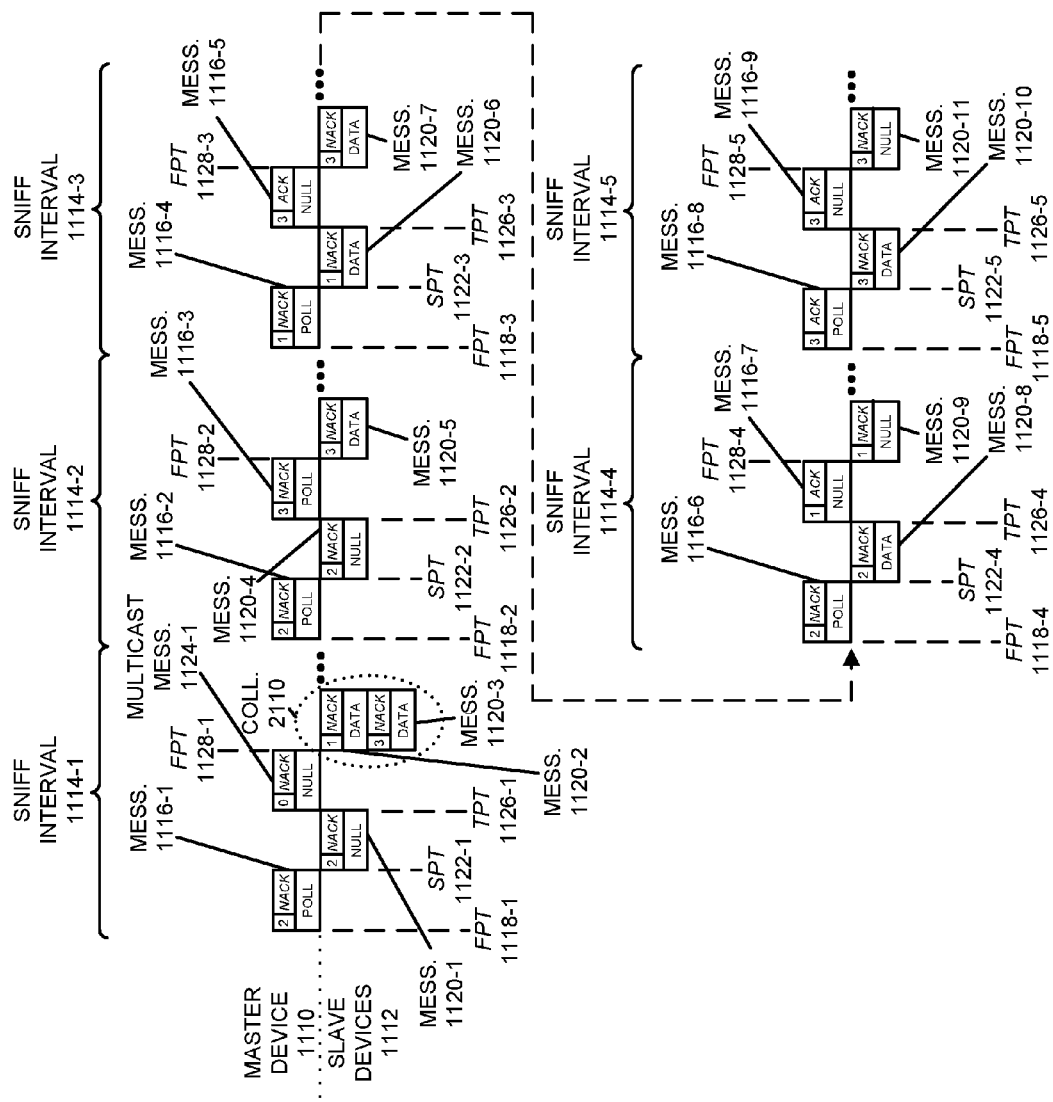
FIG. 21 is a timing diagram illustrating an example of communication between the user-interface devices and the computing device of FIG. 2.

One approach to solving this problem is to poll both pointing devices in the next sniff interval, instead of sending a multicast frame when a collision is detected (e.g., based on a CRC error or a packet header error). This is shown in FIG. 21, which presents a timing diagram illustrating an example of communication between master device 1110 and slave devices 1112. In particular, when collision 21110 occurs, master device 1110 may resolve it in sniff interval 1114-2 by polling user-interface device 224 and 230 (which may be pointing devices). Then, in subsequent sniff intervals, master device 1110 may sequentially poll all of the user-interface devices.

Figure 22:
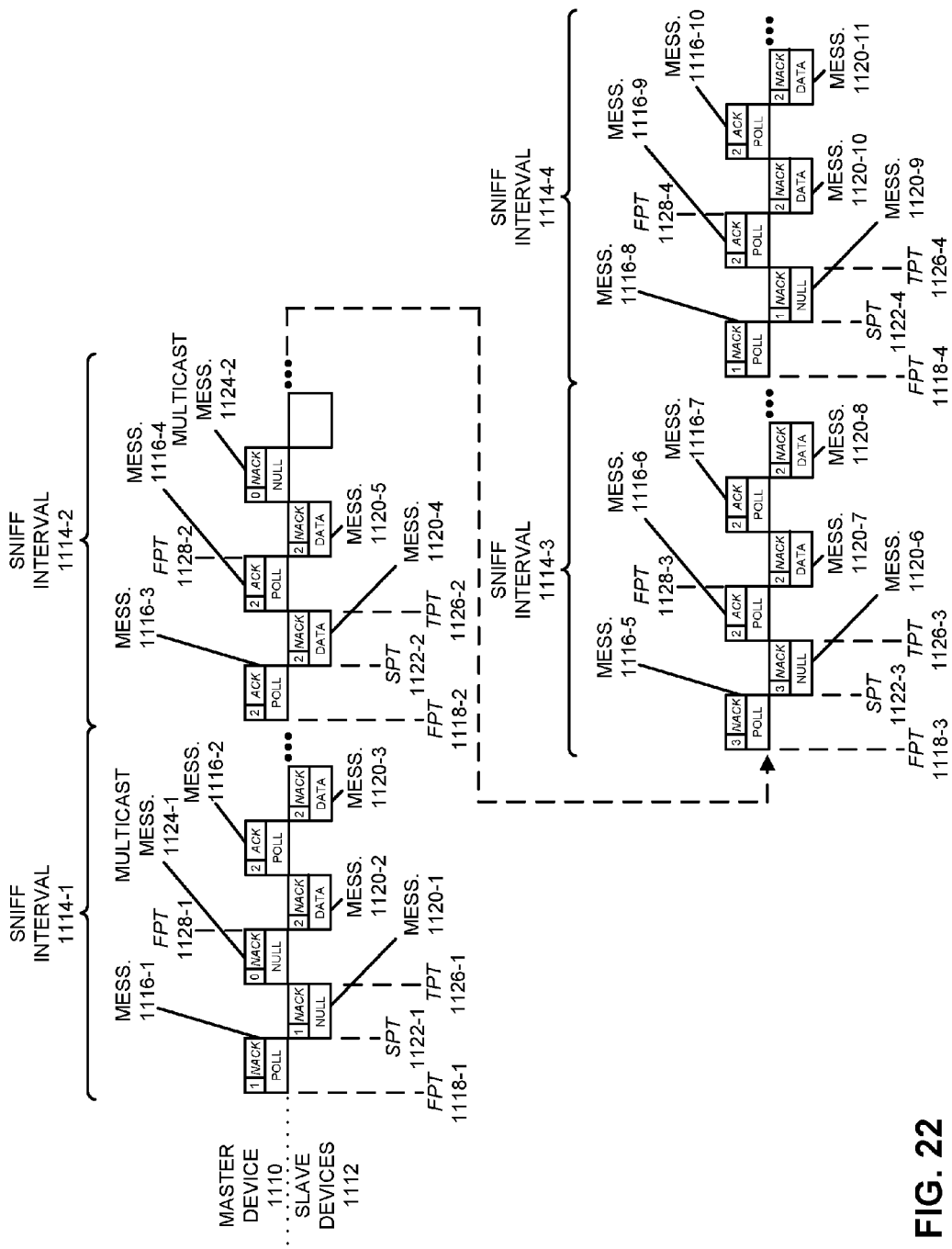
FIG. 22 is a timing diagram illustrating an example of communication between the user-interface devices and the computing device of FIG. 2.

Additionally, in some embodiments at least some user-interface devices send two packets per sniff interval, because they: have higher data-rate requirements; or require a retransmission opportunity. However, a shared sniff HID block of two frames may not support this requirement. One solution to this problem is to add another multicast frame to the HID block for a total of three frames. In this case, the master device may poll a slave device a maximum of two times per HID block. This is shown in FIG. 22, which presents a timing diagram illustrating an example of communication between master device 1110 and slave devices 1112.

Note that some use cases (e.g., gaming) may require simultaneous operation of a keyboard and one pointing device (such as a mouse or a trackpad). In general, in order to avoid collisions between the keyboard and the pointing device, the shared sniff mode may only be applied to the pointing devices. Thus, in this case, only a subset of the user-interface devices may use the shared sniff mode. (The user-interface devices that use the shared sniff mode may be selected based on the current application being executed. In particular, the user-interface devices that use the shared sniff mode may be dynamically switched.)

For example, the first frame may be used exclusively for the keyboard. Then, the second and third frame may be shared by two pointing devices (i.e., a sequentially addressed message and a multicast message in each of the second and third frames). In terms of the packet rate, the keyboard may have one packet per sniff interval. An active pointing device may have three packets in two sniff intervals, while an inactive pointing device may have one packet in two sniff intervals. Moreover, the latency for the keyboard and the pointing devices may be one sniff interval.

If the pointing devices always require two packets per sniff interval, the packet rate can be increased by selecting the multicast frame to come first in the shared-sniff-mode section (i.e., before the sequentially addressed message). Moreover, keep-alive polling for the inactive pointing device can be done in every third or fourth keyboard frame. In terms of master poll requirements, in the idle mode the master device may poll the keyboard in every keyboard frame. The master device may poll pointing devices in alternate sequential-address frames. Furthermore, the master device may send a multicast message in every multicast frame.

In the data mode, if a pointing device responds to the multicast frame, the master device may poll the pointing device in the sequential-address frame in order to acknowledge and to provide a second transmit opportunity. Moreover, if the pointing device is waiting for an acknowledgment, the master device may poll the pointing device in the multicast frame. Furthermore, if the pointing device sends data and both the multicast frame and the sequential-address frame are used by the pointing device, the master may poll the other pointing device in the keyboard frame every third (or fourth) sniff interval for keep-alive polling. Note that, if two pointing devices collide in the multicast frame, the master device may proceed with regular sequential addressing in the sequential-address frame.

In terms of slave listening requirements, in the idle mode the keyboard listens in every keyboard frame. Moreover, the pointing devices listen in every sequential-address frame. In the data mode, if the pointing device has data to send, it may also listen in the multicast frame. Furthermore, if the pointing device has not been addressed in the sequential-address frame for two sniff intervals, it may also listen in the keyboard frame.

Figure 23:
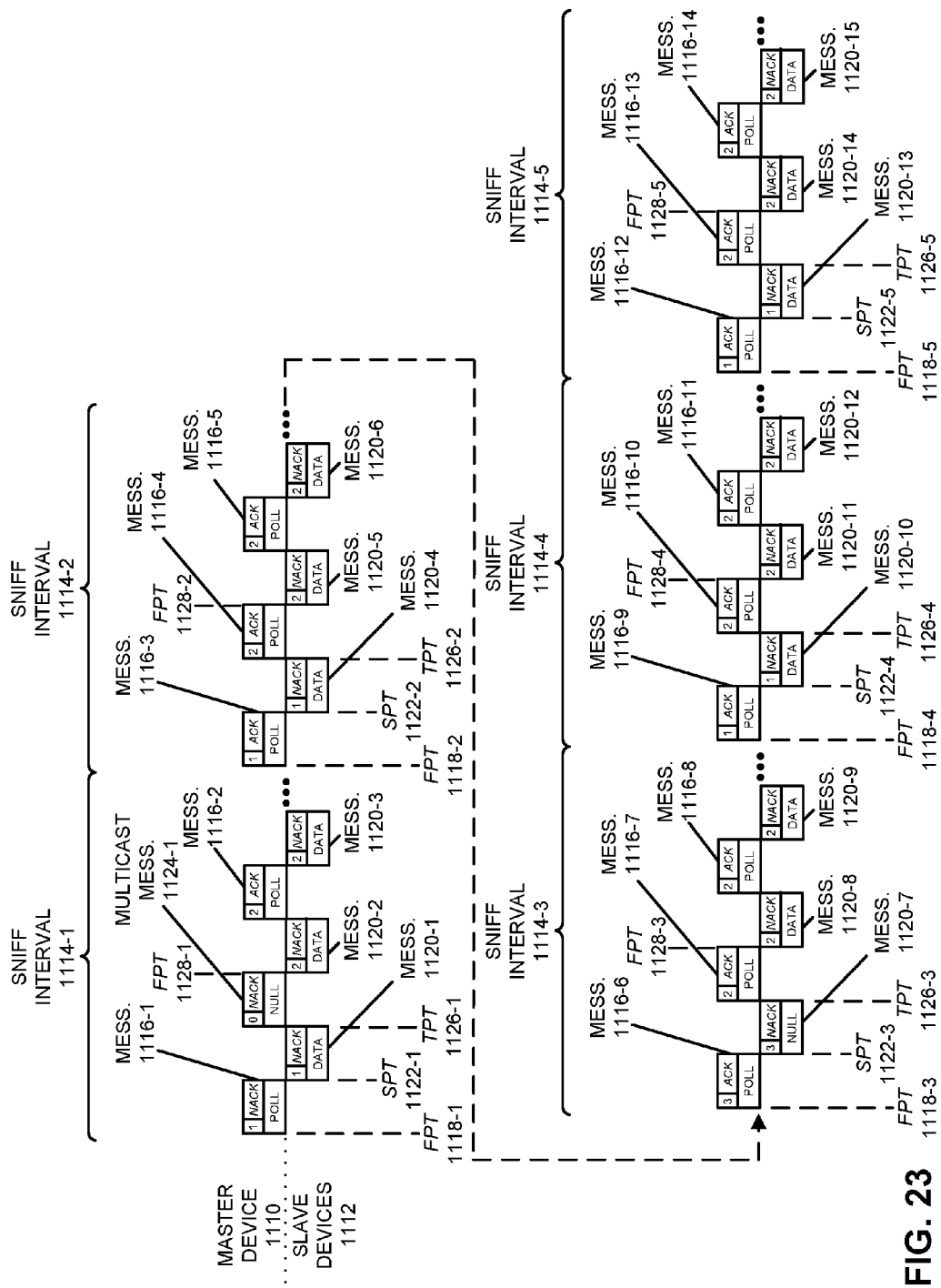
FIG. 23 is a timing diagram illustrating an example of communication between the user-interface devices and the computing device of FIG. 2.

In another example, the keyboard and a first pointing device send data packets, and a second pointing device is polled in one of three sniff intervals. This is shown in FIG. 23, which presents a timing diagram illustrating an example of communication between master device 1110 and slave devices 1112. In FIG. 23, when user-interface device 224 (the second user-interface device, such as a pointing device) has not been polled for two sniff intervals, it is polled in the frame that is normally used for user-interface device 210 in sniff interval 1114-3. Note that the packet rate for the keyboard, when the keyboard and the first pointing device are active, is two packets in three sniff intervals. Moreover, for the active first pointing device, the packet rate is two packets per sniff interval, and for the second pointing device the packet rate is one packet in three sniff intervals. Furthermore, the latency for the keyboard and the first and second pointing devices is one sniff interval.

Note that the computing device may keep track of the collision rate in the multicast frame. If the collision rate exceeds a defined threshold (such as two or more consecutive collisions), the shared sniff mode may no longer satisfy the data rate and latency requirements of the user-interface devices. In this case, the shared sniff mode may be exited and the sniff mode may be used. The decision to fall back to the sniff mode may apply to all connected user-interface devices or only for a subset of the connected user-interface devices. For example, if collisions are primarily detected between the keyboard and the mouse, but not between the mouse and the trackpad, the keyboard may be removed from the shared sniff mode and placed into the sniff mode, while the mouse and the trackpad stay in the shared sniff mode.

Furthermore, once the simultaneous traffic in the sniff mode falls below a defined threshold (such as 25 or 50% of the sniff intervals), the shared sniff mode may be re-entered. Note that simultaneous traffic is measured as the number of sniff intervals in a given timeframe, which contains data from more than one user-interface device.

In some embodiments, there are multiple multicast frames per sniff interval in the shared sniff mode.

In general, encryption for multicast null packets may not be required, because no data is transmitted. Data packets sent in response to a multicast null packet may be decrypted with the encryption key of the individual link. Moreover, the selection of the right decryption key may be done after decoding the address in the packet header.

We now describe embodiments of the electronic device. FIG. 24 presents a block diagram illustrating an electronic device 2400, such as user-interface device 210, user-interface device 224, user-interface device 230 or computing device 212 in FIG. 2. This electronic device includes processing subsystem 2410, memory subsystem 2412, networking subsystem 2414, power subsystem 2430, and optional user-interface subsystem 2434. Processing subsystem 2410 includes one or more devices configured to perform computational operations. For example, processing subsystem 2410 can include one or more microprocessors, application-specific integrated circuits (ASICs), microcontrollers, programmable-logic devices, and/or one or more digital signal processors (DSPs).

Memory subsystem 2412 includes one or more devices for storing data and/or instructions for processing subsystem 2410 and networking subsystem 2414. For example, memory subsystem 2412 can include dynamic random access memory (DRAM), static random access memory (SRAM), and/or other types of memory. In some embodiments, instructions for processing subsystem 2410 in memory subsystem 2412 include: one or more program modules or sets of instructions (such as application or program module 2422, or operating system 2424), which may be executed by processing subsystem 2410. Note that the one or more computer programs may constitute a computer-program mechanism. Moreover, instructions in the various modules in memory subsystem 2412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2410.

In addition, memory subsystem 2412 can include mechanisms for controlling access to the memory. In some embodiments, memory subsystem 2412 includes a memory hierarchy that comprises one or more caches coupled to a memory in electronic device 2400. In some of these embodiments, one or more of the caches is located in processing subsystem 2410.

In some embodiments, memory subsystem 2412 is coupled to one or more high-capacity mass-storage devices (not shown). For example, memory subsystem 2412 can be coupled to a magnetic or optical drive, a solid-state drive, or another type of mass-storage device. In these embodiments, memory subsystem 2412 can be used by electronic device 2400 as fast-access storage for often-used data, while the mass-storage device is used to store less frequently used data.

Networking subsystem 2414 includes one or more devices configured to couple to and communicate on a wired and/or wireless network (i.e., to perform network operations), including: control logic 2416, an interface circuit 2418 and one or more antennas 2420. For example, networking subsystem 2414 can include: a Bluetooth networking system (such as a Bluetooth low energy networking system), a cellular networking system (e.g., a 3G/4G network such as UMTS, LTE, etc.), a universal serial bus (USB) networking system, a networking system based on the standards described in IEEE 402.11 (e.g., a Wi-Fi networking system), an Ethernet networking system, an Ultra-wideband networking system, an Institute of Electrical and Electronics Engineers (IEEE) 802.15 networking system (such as ZigBee), a power-line communication networking system, an infra-red communication networking system, a near-field-communication networking system, a wireless adhoc network networking system, a multicast wireless networking system (such as ANT or ANT+, from Dynastream Innovations, Inc. of Cochrane, Canada), and/or another networking system.

Networking subsystem 2414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 2400 may use the mechanisms in networking subsystem 2414 for performing simple wireless communication between the electronic devices, e.g., transmitting advertising or beacon frames and/or scanning for advertising frames transmitted by other electronic devices.

Furthermore, power subsystem 2430 may include one or more components for providing power to electronic device 2400, such as a battery 2432 (and, more generally, an energy-storage component). Note that power subsystem 2430 may include circuits for charging and, more generally, managing energy storage in battery 2432.

Additionally, optional user-interface subsystem 2434 may include a user-interface component 2436 (such as a mouse, a keyboard and/or a touchpad). Note that optional user-interface subsystem 2434 may include circuits and/or a processor for interpreting user-interface events received from a user of user-interface component 2436 and/or for providing feedback about a user-interface event to the user via user-interface component 2436.

Within electronic device 2400, processing subsystem 2410, memory subsystem 2412, networking subsystem 2414, power subsystem 2430 and optional user-interface subsystem 2434 are coupled together using bus 2428. Bus 2428 may include an electrical, optical, and/or electro-optical connection that the subsystems can use to communicate commands and data among one another. Although only one bus 2428 is shown for clarity, different embodiments can include a different number or configuration of electrical, optical, and/or electro-optical connections between the subsystems.

In some embodiments, electronic device 2400 includes a display subsystem 2426 for displaying information on a display, which may include a display driver and the display, such as a liquid-crystal display, a multi-touch touchscreen, etc.

Electronic device 2400 can be (or can be included in) any electronic device with at least one network interface. For example, electronic device 2400 can be (or can be included in): a desktop computer, a laptop computer, a server, a media player (such as an MP3 player), an appliance, a subnotebook/netbook, a tablet computer, a smartphone, a cellular telephone, a smartwatch, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device. Moreover, user-interface component 2436 may include: a mouse, a keyboard, a trackpad, a headset and, more generally, a sensor or a device that receives or measures a user behavior or action.

Although specific components are used to describe electronic device 2400, in alternative embodiments, different components and/or subsystems may be present in electronic device 2400. For example, electronic device 2400 may include one or more additional processing subsystems, memory subsystems, networking subsystems, power subsystems, user-interface devices and/or display subsystems. Additionally, one or more of the subsystems may not be present in electronic device 2400. Moreover, in some embodiments, electronic device 2400 may include one or more additional subsystems that are not shown in FIG. 24. For example, electronic device 2400 can include, but is not limited to, a data collection subsystem, an audio and/or video subsystem, an alarm subsystem, a media processing subsystem, and/or an input/output (I/O) subsystem. Also, although separate subsystems are shown in FIG. 24, in some embodiments, some or all of a given subsystem or component can be integrated into one or more of the other subsystems or component(s) in electronic device 2400. For example, in some embodiments program module 2422 is included in operating system 2424.

Moreover, the circuits and components in electronic device 2400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2414, such as a radio. Moreover, the integrated circuit may include hardware and/or software mechanisms that are used for transmitting wireless signals from electronic device 2400 and receiving signals at electronic device 2400 from other electronic devices. Aside from the mechanisms herein described, radios are generally known in the art and hence are not described in detail. In general, networking subsystem 2414 and/or the integrated circuit can include any number of radios. Note that the radios in multiple-radio embodiments function in a similar way to the described single-radio embodiments.

In some embodiments, networking subsystem 2414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with Bluetooth standards was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program module 2422, operating system 2424 (such as a driver for interface circuit 2418) or in firmware in interface circuit 2418. Alternatively or additionally, at least some of the operations in the communication techniques may be implemented in a physical layer, such as hardware in interface circuit 2418.

Note that numerical values used in the preceding discussion are for purposes of illustration, and that different values may be used in the embodiments.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computing device, comprising:
   an antenna;
   an interface circuit, coupled to the antenna, which, during operation, communicates with user-interface devices via a link using a communication protocol, wherein, during operation, the interface circuit:

transmits outgoing messages to the user-interface devices at a first predefined time during sequential time intervals when the user-interface devices transition from a sleep mode to a normal mode, wherein a given outgoing message at the first predefined time during a given sequential time interval is addressed to a specific user-interface device;

receives incoming messages from the user-interface devices at a second predefined time following the first predefined time during the sequential time intervals, wherein a given incoming message is received at the second predefined time during the given sequential time interval from the specific user-interface device;

transmits, when the given incoming message excludes information specifying a user-interface event, multicast messages to the user-interface devices at a third predefined time following the second predefined time during the sequential time intervals.

2. The computing device of claim 1, wherein:

during operation, the interface circuit transmits, when the given incoming message includes the information specifying the user-interface event, a reply message to the specific user-interface device at the third predefined time during the given sequential time interval, wherein the specific user-interface device waits in the normal mode for the reply message until at most a subsequent sequential time interval; and the reply message includes feedback based on the information specifying the user-interface event that is presented to a user by the specific user-interface device.

3. The computing device of claim 2, wherein the specific user-interface device waits in the normal mode to receive the reply message based on one of: a type of a user-interface component of the specific user-interface device; and a type of the user-interface event.

4. The computing device of claim 1, wherein the communication protocol includes Bluetooth and the sequential time intervals include sniff intervals.

5. The computing device of claim 1, wherein, during operation, the interface circuit receives, in response to one of the multicast messages, an incoming message from one of the user-interface devices at a fourth predefined time after the third predefined time in one of the sequential time intervals.

6. The computing device of claim 5, wherein, during operation, when the incoming message includes data, the interface circuit transmits an acknowledgment message to the one of the user-interface devices at one of the first predefined time and a third predefined time in a subsequent time interval after the one of the sequential time intervals.

7. The computing device of claim 5, wherein the incoming message encompasses more than one time slot in the one of the sequential time intervals.

8. The computing device of claim 1, wherein, during operation, when a collision occurs between a first incoming message and a second incoming message, the interface circuit sequentially polls the user-interface devices to receive the first incoming message and the second incoming message without a subsequent collision.

9. The computing device of claim 1, wherein, during operation, when a number of collisions exceeds a threshold value, the interface circuit transmits the outgoing messages at predefined times during each of the sequential time intervals and discontinues transmitting the multicast messages.

10. The computing device of claim 1, wherein, during operation, when the interface circuit has data for one of the user-interface devices, the interface circuit transmits the data using a first occurrence of one of: an outgoing message at the first predefined time during one of the sequential time intervals addressed to the one of the user-interface devices; and one of the multicast messages.

11. The computing device of claim 1, wherein, during operation, the interface circuit communicates to the user-interface devices an adaptive frequency-hopping schedule and a future start time when the adaptive frequency-hopping schedule is used, so that the user-interface devices listen to correct frequencies during transmission of the multicast messages.

12. The computing device of claim 1, wherein, during operation, the interface circuit transmits second outgoing messages to a second user-interface device at a fifth predefined time following a fourth predefined time during each of the sequential time intervals.

13. The computing device of claim 1, wherein, during operation, the interface circuit transmits second multicast messages to the user-interface devices at a fifth predefined time following a fourth predefined time during each of the sequential time intervals.

14. The computing device of claim 1, wherein the interface circuit includes:

a processor; and a memory that stores an embedded operating system, wherein, during operation the processor executes the embedded operating system and performs the operations of: transmitting the outgoing messages, receiving the incoming messages, and conditionally transmitting the multicast messages.

15. A computer-program product comprising a non-transitory computer-readable storage medium and a computer-program mechanism embedded therein to communicate with user-interface devices via a link using a communication protocol, the computer-program mechanism including:

instructions for transmitting, via an interface circuit, outgoing messages to the user-interface devices at a first predefined time during sequential time intervals when the user-interface devices transition from a sleep mode to a normal mode, wherein a given outgoing message at the first predefined time during a given sequential time interval is addressed to a specific user-interface device;

instructions for receiving incoming messages from the user-interface devices at a second predefined time following the first predefined time during the sequential time intervals, wherein a given incoming message is received at the second predefined time during the given sequential time interval from the specific user-interface device; and instructions for transmitting, when the given incoming message excludes information specifying a user-interface event, a multicast message to the user-interface devices at a third predefined time following the second predefined time during the sequential time intervals.

16. An interface-circuit-based method for communicating with user-interface devices via a link using a communication protocol, wherein the method comprises an interface circuit of a computing device:

transmitting outgoing messages to the user-interface devices at a first predefined time during sequential time intervals when the user-interface devices transition from a sleep mode to a normal mode, wherein a given outgoing message at the first predefined time during a given sequential time interval is addressed to a specific user-interface device;

receiving incoming messages from the user-interface devices at a second predefined time following the first predefined time during the sequential time intervals, wherein a given incoming message is received at the second predefined time during the given sequential time interval from the specific user-interface device; and transmitting, when the given incoming message excludes information specifying a user-interface event, a multicast message to the user-interface devices at a third predefined time following the second predefined time.

17. The method of claim 16, wherein the method further comprises the interface circuit transmitting, when the given incoming message includes information specifying the user-interface event, a reply message to the specific user-interface device at the third predefined time during the given sequential time interval, wherein the specific user-interface device waits in the normal mode for the reply message until at most a subsequent sequential time interval.

18. The method of claim 17, wherein the specific user-interface device waits in the normal mode to receive the reply message based on one of: a type of a user-interface component of the specific user-interface device; and a type of the user-interface event.

19. The method of claim 16, wherein the method further comprises the interface circuit receiving, in response to one of the multicast messages, an incoming message from one of the user-interface devices at a fourth predefined time after the third predefined time in one of the sequential time intervals.

20. The method of claim 16, wherein the method further comprises the interface circuit, when a collision occurs between a first incoming message and a second incoming message, sequentially polling the user-interface devices to receive the first incoming message and the second incoming message without a subsequent collision.

* * * * *